US009087181B2

(12) United States Patent
Tokunaga et al.

(10) Patent No.: US 9,087,181 B2
(45) Date of Patent: Jul. 21, 2015

(54) METHOD OF MANAGING VIRTUAL COMPUTER, COMPUTER SYSTEM AND COMPUTER

(75) Inventors: Shinichi Tokunaga, Yokohama (JP); Tomohito Uchida, Yokohama (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 13/993,094

(22) PCT Filed: Dec. 16, 2010

(86) PCT No.: PCT/JP2010/072698
§ 371 (c)(1),
(2), (4) Date: Jul. 12, 2013

(87) PCT Pub. No.: WO2012/081114
PCT Pub. Date: Jun. 21, 2012

(65) Prior Publication Data
US 2013/0283367 A1    Oct. 24, 2013

(51) Int. Cl.
*G06F 7/04* (2006.01)
*G06F 12/14* (2006.01)
*G06F 21/30* (2013.01)
*G06F 21/62* (2013.01)
*G06F 21/44* (2013.01)

(52) U.S. Cl.
CPC ................ *G06F 21/30* (2013.01); *G06F 21/44* (2013.01); *G06F 21/62* (2013.01)

(58) Field of Classification Search
None
See application file for complete search history.

(56) References Cited

U.S. PATENT DOCUMENTS

| 2002/0152394 | A1 | 10/2002 | Kadoya |
| 2003/0005213 | A1 | 1/2003 | Suzuki |
| 2010/0031257 | A1 | 2/2010 | Ikegaya et al. |
| 2010/0332820 | A1* | 12/2010 | Matsushima et al. ......... 713/150 |
| 2011/0107331 | A1* | 5/2011 | Evans et al. ...................... 718/1 |

FOREIGN PATENT DOCUMENTS

| JP | 2003-005859 A | 1/2003 |
| JP | 2010-033403 A | 2/2010 |
| WO | 00/13089 A1 | 3/2000 |

OTHER PUBLICATIONS

Ito, H.; "Network & Security Hands on Technic"; Network Security Expert 3; Dec. 25, 2005; pp. 138-149; with English Abstract.

* cited by examiner

*Primary Examiner* — Kaveh Abrishamkar
(74) *Attorney, Agent, or Firm* — Mattingly & Malur, PC

(57) ABSTRACT

A method of managing a virtual computer in a computer system including a plurality of computers, each of the computer storing a program for realizing a virtualization management module for managing a virtual computer, including a management storage area that is accessible only by the virtualization management module, storing start-up management information representing a correspondence among identification information on the virtual computer, identification information on a logical storage area storing a service program, and start-up authentication information for starting the virtual computer. The method including: a step of referring to the start-up management information to determine whether the start-up authentication information corresponding to the virtual computer exists, in a case of receiving a start-up request; a step of reading the service program from the logical storage area and executing the read service program, in a case of being determined the start-up authentication information exists.

19 Claims, 23 Drawing Sheets

START-UP KEY MANAGEMENT TABLE

| VIRTUAL SERVER ID | START-UP KEY |
|---|---|
| 1 | AAAA |
| 2 | BBBB |
| 3 | CCCC |
| 4 | DDDD |
| 5 | EEEE |
| ⋮ | ⋮ |

*Fig. 4*

LU MANAGEMENT TABLE

| VIRTUAL SERVER ID | LUID |
|---|---|
| 1 | LU01 |
| 2 | LU02 |
| 3 | LU03 |
| 4 | LU04 |
| 5 | LU05 |
| ⋮ | ⋮ |

Fig. 5

METHOD OF MANAGING VIRTUAL COMPUTER, COMPUTER SYSTEM AND COMPUTER

BACKGROUND OF THE INVENTION

This invention relates to a method of managing a virtual computer operating on a physical computer. This invention particularly relates to start-up processing for a virtual computer.

As the cloud computing becomes widespread, a user can carry out a service by using a plurality of physical computers (resources) installed in a datacenter providing a cloud service. In the datacenter, a plurality of virtual computers can be constituted by using a single physical computer (resource).

On the virtual computer, an OS for executing the service of the user and the like runs. The virtual computer is stored as an image file in a storage medium such as an HDD of the physical computer, and the virtual server can be moved to another physical computer by replacing of the HDD or migration of the image file to another physical computer.

Thus, an administrator or the like of the datacenter can migrate the virtual computer to another physical computer, and can start the virtual computer.

In the conventional management method, a malicious administrator or the like can acquire the image file of the virtual computer, and can start the virtual computer on another physical computer. In other words, there is such a problem that the obtaining of data and the hacking of the virtual server can be easily carried out.

As a method for restraining the virtual computer from being started at a timing not intended by a user, there is known a method involving restraining the start-up of the virtual computer in a case where a WWN corresponding to a virtual HBA assigned to the virtual computer has a value meaning start-up restraining (for example, refer to Japanese Patent Application Laid-open No. 2010-033403).

SUMMARY OF THE INVENTION

However, the invention described in Japanese Patent Application Laid-open No. 2010-033403 restrains the start-up of the virtual computer in the same physical computer, and does not restrain the start-up of the virtual computer that has migrated to another physical computer. In other words, the above-mentioned invention does not limit execution of the executable image of the virtual computer only to a specific physical computer.

Moreover, authentication processing between a management computer managing the datacenter and the physical computer cannot restrain the start-up of the virtual computer by a malicious administrator or the like.

This invention has been made in view of the above-mentioned problem, and therefore has an object to enable the start-up of a virtual computer only on a specific physical computer, and to restrain the start-up of the virtual computer on another physical computer.

The present invention can be appreciated by the description which follows in conjunction with the following figures, wherein: a method of managing a virtual computer in a computer system including a plurality of computers, the plurality of computers including a first computer. The first computer has a first processor, a first memory coupled to the first processor, a first network interface coupled to the first processor, and a first storage medium coupled to the first processor. The first memory stores a program for realizing a first virtualization management module for generating at least one virtual computer by dividing a computer resource included in the computer and managing the at least one virtual computer. The first memory includes a first management storage area that is accessible only by the first virtualization management module. The first storage medium includes a logical storage area generated by logically dividing a storage area of the first storage medium. The logical storage area stores a service program for executing a service on the at least one virtual computer. The first management storage area stores first start-up management information representing a correspondence among identification information on the at least one virtual computer, identification information on the logical storage area of the first storage medium storing the service program, and start-up authentication information for starting the at least one virtual computer. The first computer has a first virtual computer for executing a first service program generated thereon. The method including: a first step of generating, by the first virtualization management module, first start-up authentication information, in a case of receiving a generation command for the start-up authentication information for starting the first virtual computer; a second step of storing, by the first virtualization management module, a correspondence among the identification information on the first virtual computer, the identification information on the logical storage area of the first storage medium storing the first service program, and the generated first start-up authentication information in the first start-up management information; a third step of referring, by the first virtualization management module, to the first start-up management information based on the identification information on the first virtual computer to determine whether the first start-up authentication information corresponding to the first virtual computer exists, in a case of receiving a start-up request for the first virtual computer including the identification information on the first virtual computer, a fourth step of reading, by the first virtualization management module, the first service program from the logical storage area of the first storage medium, in a case where the first virtualization management module determines that the first start-up authentication information corresponding to the first virtual computer exists in the first start-up management information; and a fifth step of starting, by the first virtualization management module, the first virtual computer by executing the read first service program.

According to this invention, the virtual computer is not started in a case where the start-up authentication information corresponding to the virtual computer does not exist in the start-up management information. Thus, even when a malicious administrator obtains the service program including the executable image of the virtual computer and the like, the virtual computer is not started on another computer, resulting in an increase in security.

BRIEF DESCRIPTION OF THE DRAWINGS

The present invention can be appreciated by the description which follows in conjunction with the following figures, wherein:

FIG. 4 is an explanatory diagram illustrating details of a start-up key management table according to the first embodiment of this invention;

FIG. 5 is an explanatory diagram illustrating details of a LU management table according to the first embodiment of this invention;

DETAILED DESCRIPTION OF THE PREFERRED EMBODIMENTS

Figure 1:
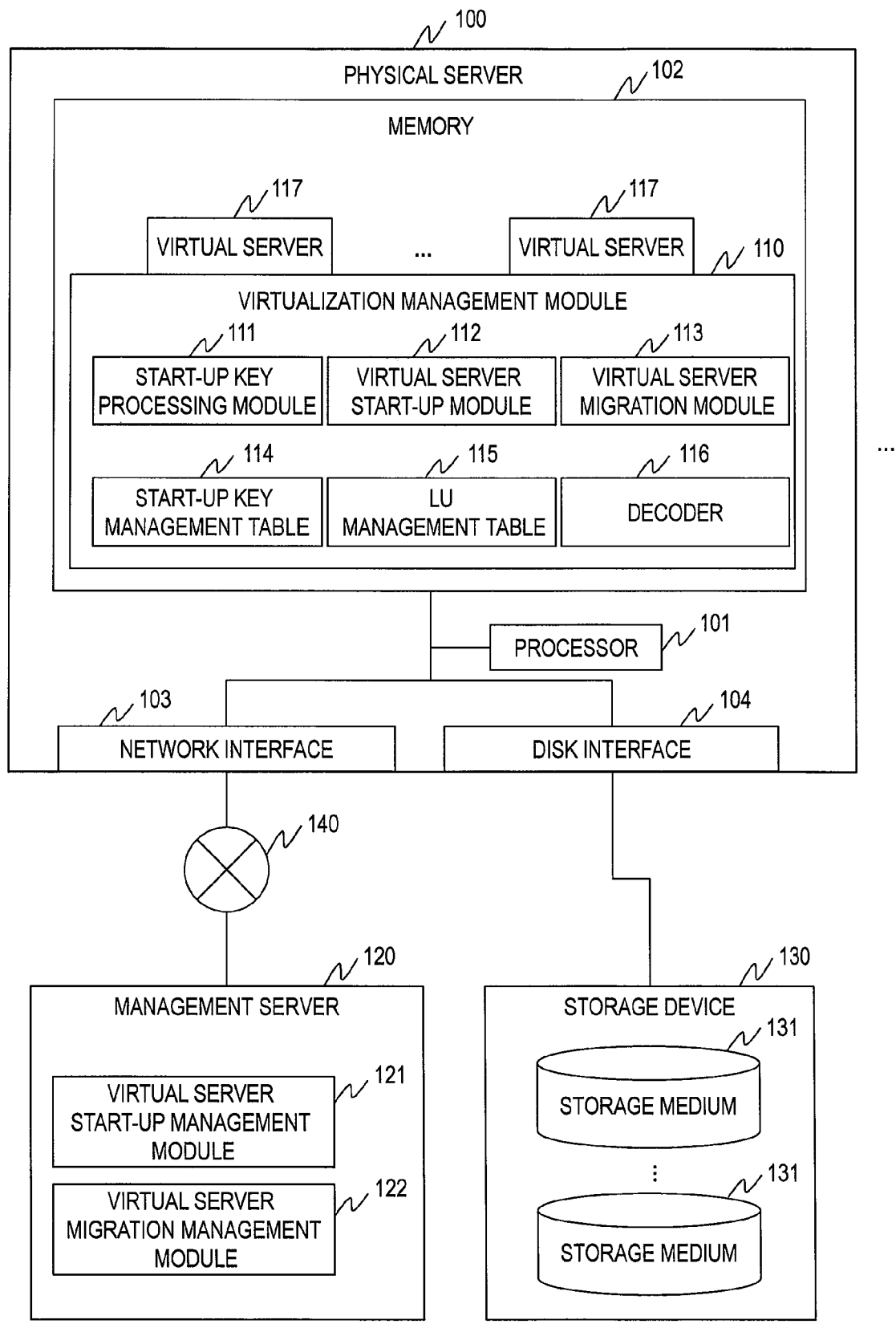
FIG. 1 is a block diagram illustrating an example of a computer system according to a first embodiment of this invention.

Referring to the accompanying drawings, embodiments of this invention are described below. It should be noted that components assigned with the same reference numerals have the same configuration or function.

First Embodiment

FIG. 1 is a block diagram illustrating an example of a computer system according to a first embodiment of this invention.

The computer system according to this embodiment includes a plurality of physical servers 100, a management server 120, and a storage device 130.

Each of the physical servers 100 is coupled to the management server 120 via a network 140. The network 140 may be a network of any coupling type, and, for example, an IP network, a WAN, a LAN, and the like can be conceived. It should be noted that the physical server 100 and the management server 120 may be directly coupled to each other.

Moreover, the physical server 100 is coupled via a SAN or the like or directly to the storage device 130. It should be noted that one of the physical servers 100 may be coupled to one storage device 130, or the plurality of physical servers 100 may be coupled to one or a plurality of storage devices 130.

The management server 120 manages the physical servers 100 in the computer system. The management server 120 includes at least a processor (not shown), a memory (not shown), a storage medium (not shown), and a network interface (not shown).

A program for realizing a virtual server start-up management module 121 and a virtual server migration management module 122 is read onto the memory (not shown), and is executed by the processor (not shown).

The virtual server start-up management module 121 provides an interface for inputting information required to start a virtual server 117, and transmits information input to the interface to each of the physical servers 100.

The virtual server migration management module 122 provides an interface for inputting information required for the migration of a virtual server 117, and transmits information input to the interface to each of the physical servers 100.

The storage device 130 stores information on the physical servers 100. The storage device 130 includes a plurality of storage media 131. It should be noted that the storage device 130 may constitute a disk array based on the plurality of storage media 131, and may provide the physical server 100 with a logical storage area constituted by the disk array.

The physical server 100 includes a processor 101, a memory 102, a network interface 103, and a disk interface 104.

The processor 101 executes programs stored on the memory 102. As a result, functions included in the physical server 100 can be realized.

The memory 102 temporarily stores a program to be executed by the processor 101, and information necessary to execute the program. Specifically, a program for realizing a virtualization management module 110 is stored on the memory 102.

The virtualization management module 110 generates a virtual server 117, and manages the generated virtual server 117. On the virtual server 117, a guest OS 301 (refer to FIG. 3) is executed.

For example, the virtualization management module 110 generates the virtual server 117 by dividing computer resources (such as the processor 101 and the memory 102) included in the physical server 100 and assigning the divided computer resources to the virtual server 117. The guest OS 301 (refer to FIG. 3) to be executed on the virtual server 117 and the like are stored as an executable image of the virtual server 117 in the storage device 130.

The assignment of the computer resources is hereinafter referred to as "generation of a virtual server 117".

The virtualization management module 110 includes a start-up key processing module 111, a virtual server start-up module 112, a virtual server migration module 113, a start-up key management table 114, an LU management table 115, and a decoder 116.

The start-up key processing module 111 executes processing relating to a start-up key. Specifically, the start-up key processing module 111 generates the start-up key, and deletes the start-up key. Herein, the start-up key is authentication information required for start-up processing for a virtual server 117.

The virtual server start-up module 112 executes start-up processing for a virtual server 117.

The virtual server migration module 113 executes migration processing of migrating a virtual server 117 between the physical servers 100.

The start-up key management table 114 stores each of relationships between a start-up key and a virtual server 117. Referring to FIG. 4, a detailed description is given later of the start-up key management table 114.

Figure 5:
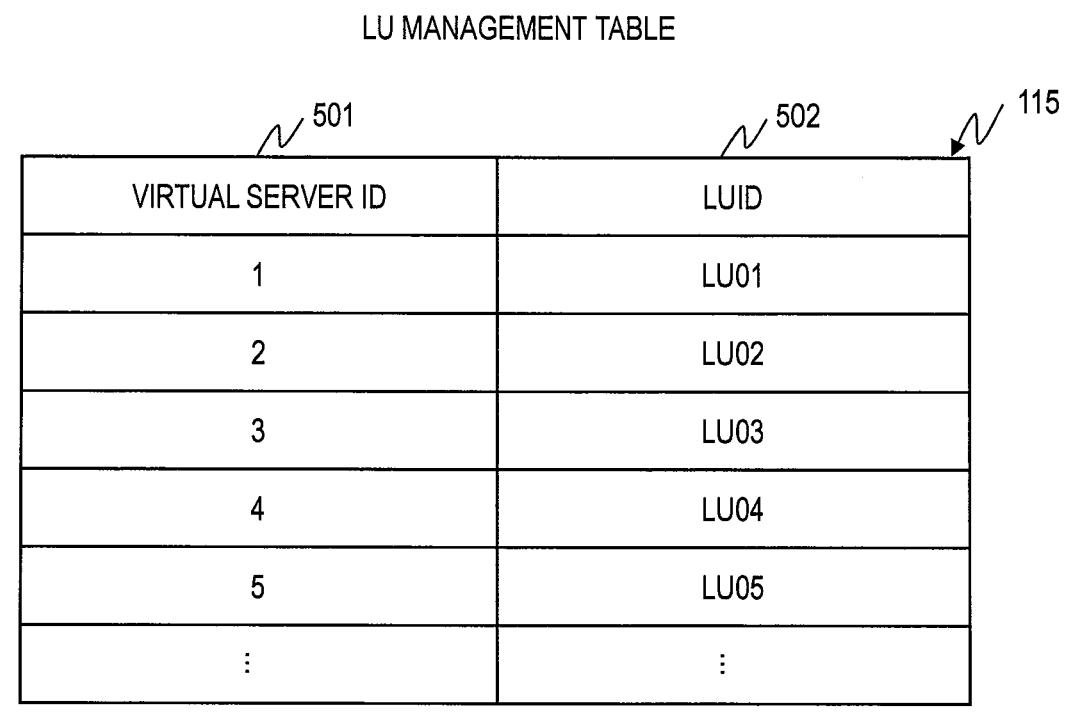

The LU management table 115 stores information on storage areas storing virtual servers 117 and executable images of the virtual servers 117. Referring to FIG. 5, a detailed description is given later of the LU management table 115.

The decoder 116 decodes encrypted information. According to this embodiment, the decoder 116 decrypts an encrypted start-up key.

The network interface 103 is an interface for coupling to the management server 120 via the network 140.

The disk interface 104 is an interface for coupling to the storage device 130.

Figure 2:
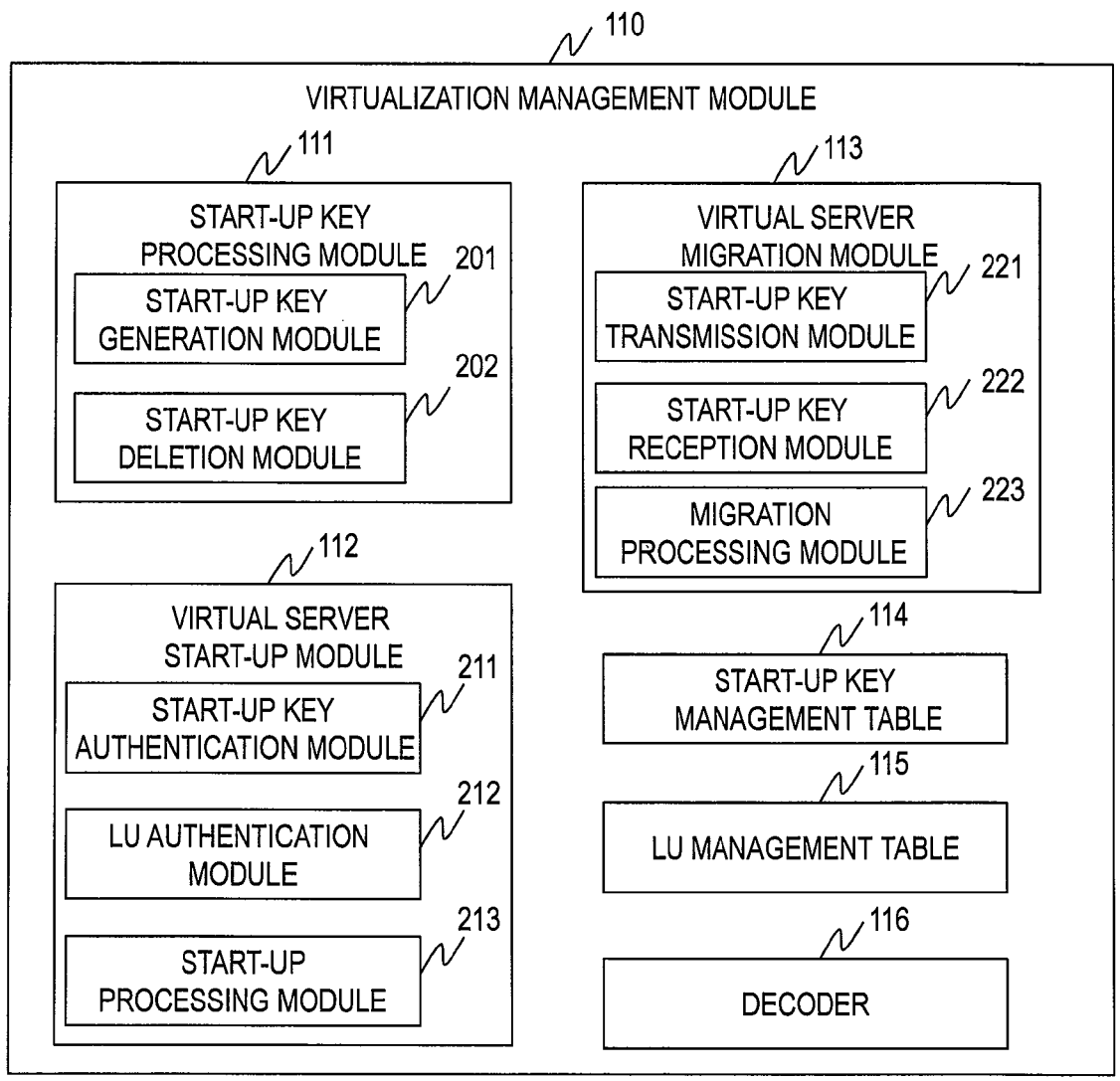
FIG. 2 is a block diagram illustrating details of a virtualization management module according to the first embodiment of this invention.

FIG. 2 is a block diagram illustrating details of the virtualization management module 110 according to the first embodiment of this invention.

The start-up key processing module 111 includes a start-up key generation module 201 and a start-up key deletion module 202.

Figure 7:
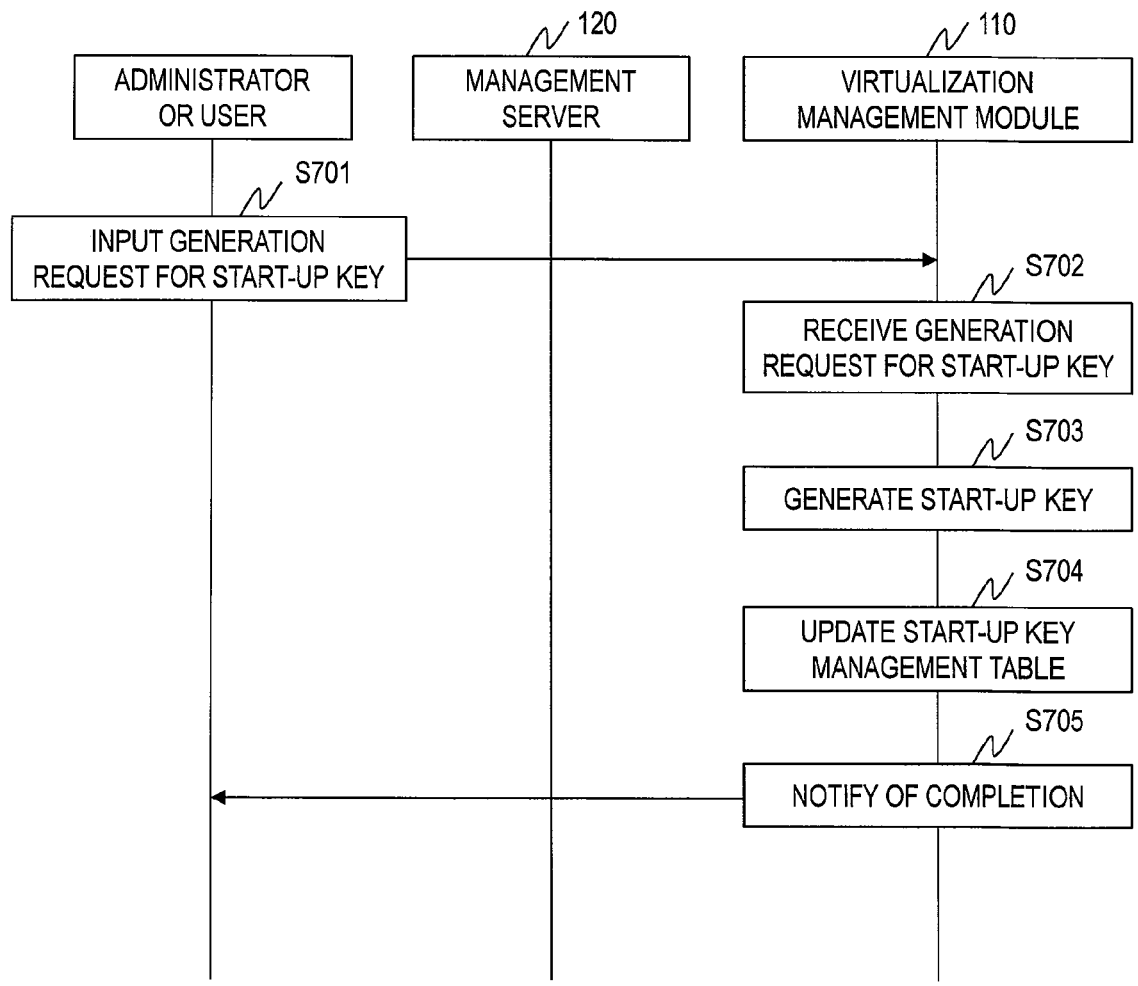
FIG. 7 is a sequence diagram illustrating a flow of generation processing for a start-up key according to the first embodiment of this invention.
Figure 8:
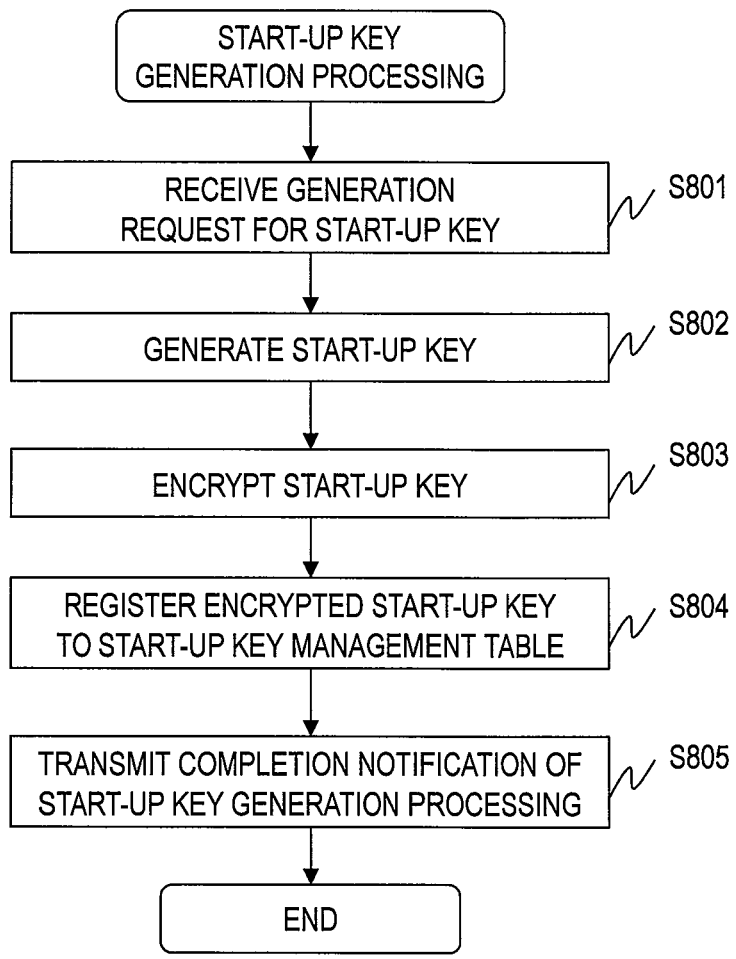
FIG. 8 is a flowchart illustrating details of the generation processing for a start-up key according to the first embodiment of this invention.

The start-up key generation module 201 executes generation processing of generating a start-up key. Referring to FIGS. 7 and 8, a description is given later of the generation processing for a start-up key.

Figure 9:
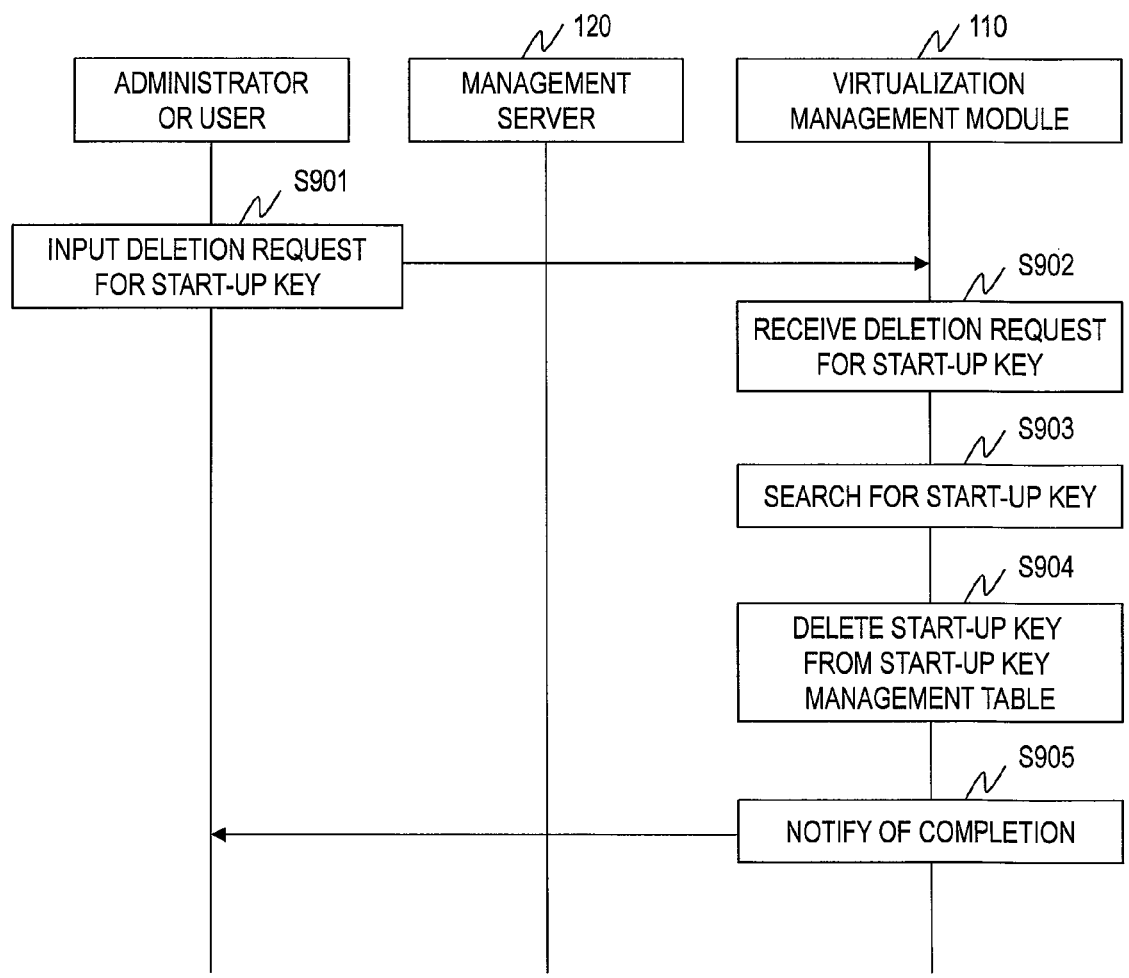
FIG. 9 is a sequence diagram illustrating a flow of deletion processing for a start-up key according to the first embodiment of this invention.
Figure 10:
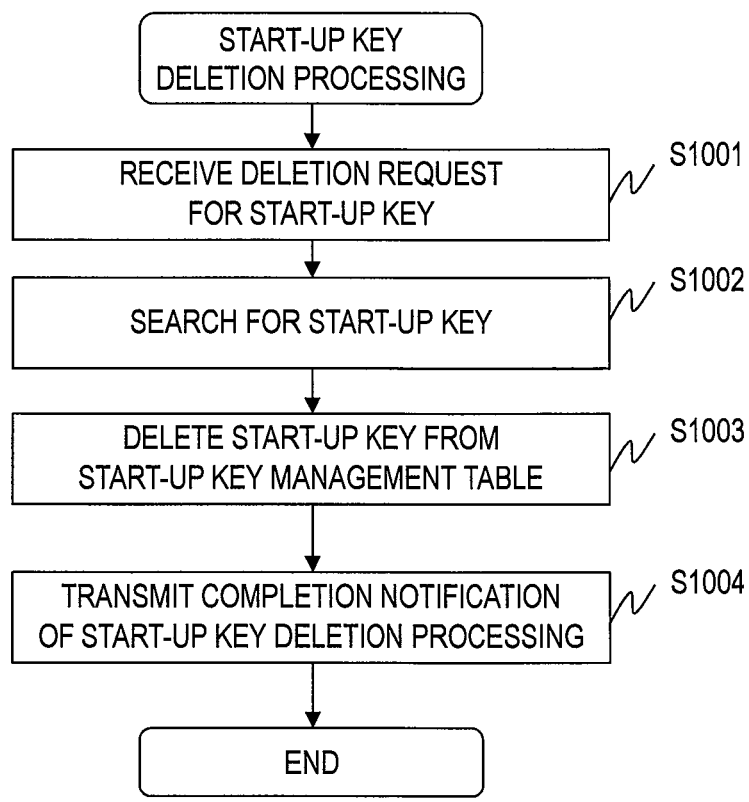
FIG. 10 is a flowchart illustrating details of the deletion processing for a start-up key according to the first embodiment of this invention.

The start-up key deletion module 202 executes deletion processing of deleting a start-up key. Referring to FIGS. 9 and 10, a description is given later of the deletion processing for a start-up key.

It should be noted that the start-up key processing module 111 may hold the start-up key generation module 201 and the start-up key deletion module 202 as a single configuration.

The virtual server start-up module 112 includes a start-up key authentication module 211, an LU authentication module 212, and a start-up processing module 213.

Figure 11A:
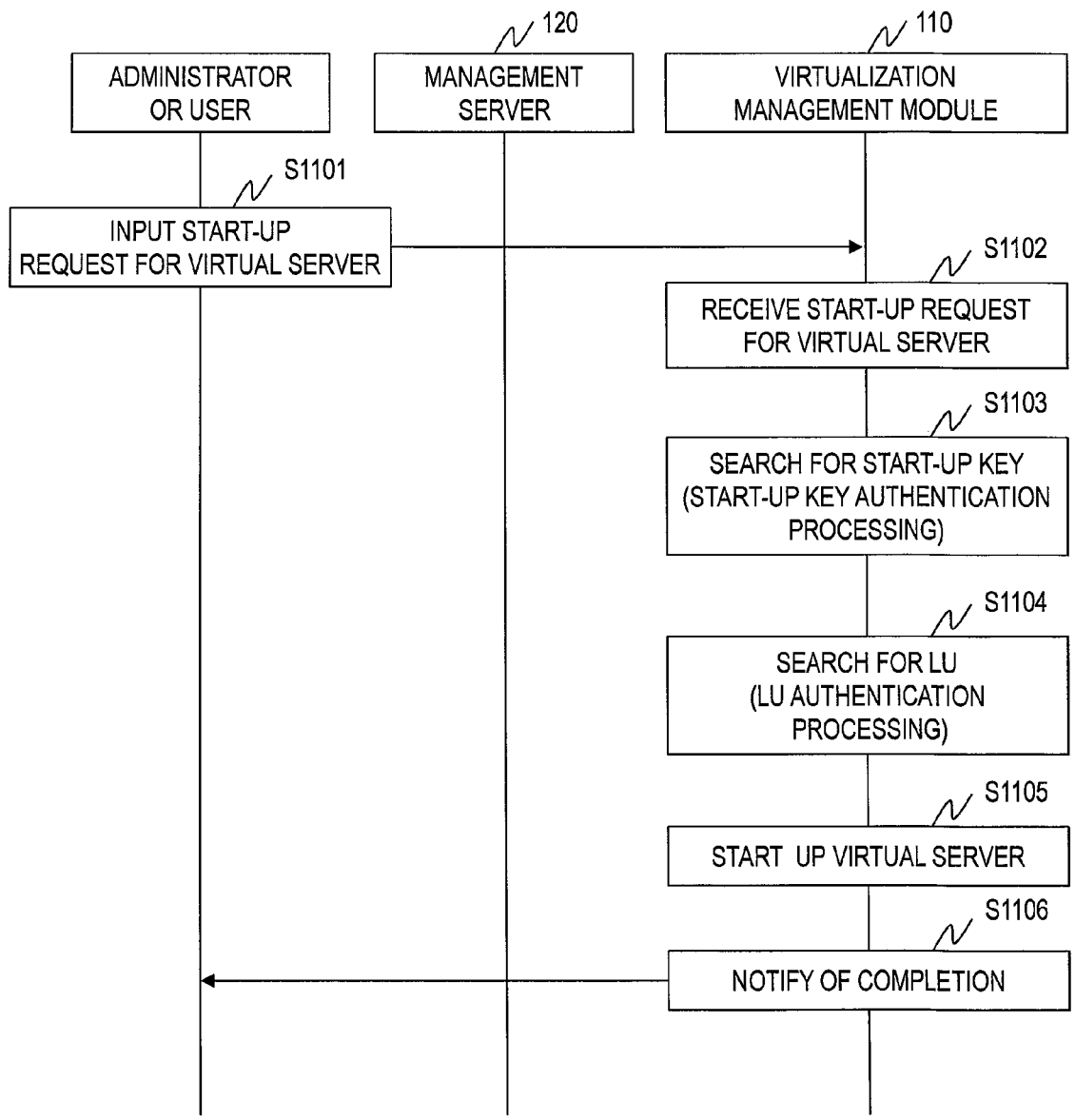
FIG. 11A is a sequence diagram illustrating a flow of start-up processing for a virtual server according to the first embodiment of this invention.
Figure 11B:
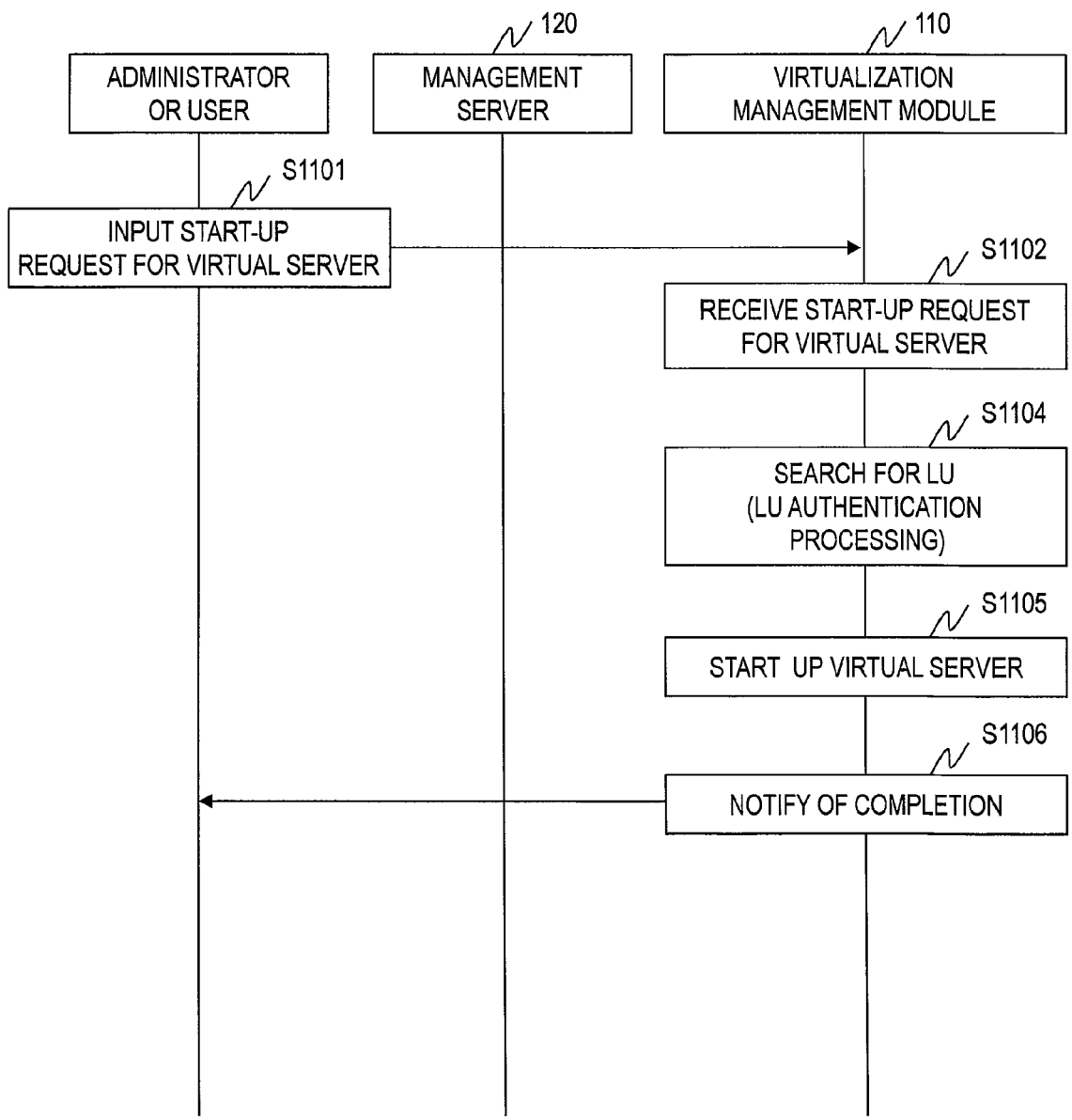
FIG. 11B is a sequence diagram illustrating a flow of the start-up processing in a case where a start-up key for a virtual server is not used according to the first embodiment of this invention.
Figure 12:
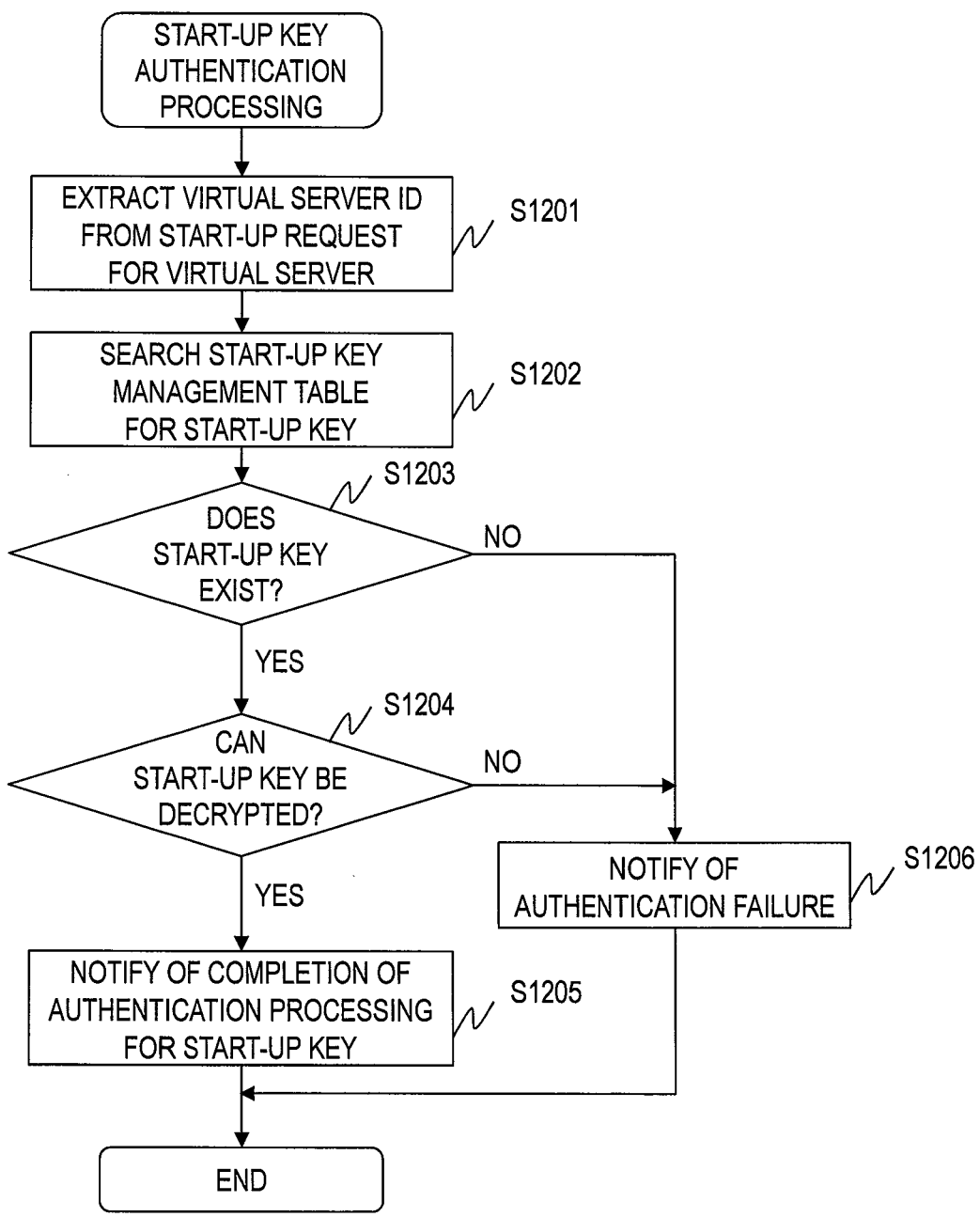
FIG. 12 is a flowchart illustrating details of authentication processing for a start-up key according to the first embodiment of this invention.

The start-up key authentication module 211 carries out authentication processing for a virtual server 117 based on a start-up key during the start-up processing. Referring to FIGS. 11A, 11B and 12, a description is given later of the authentication processing for a start-up key.

Figure 13:
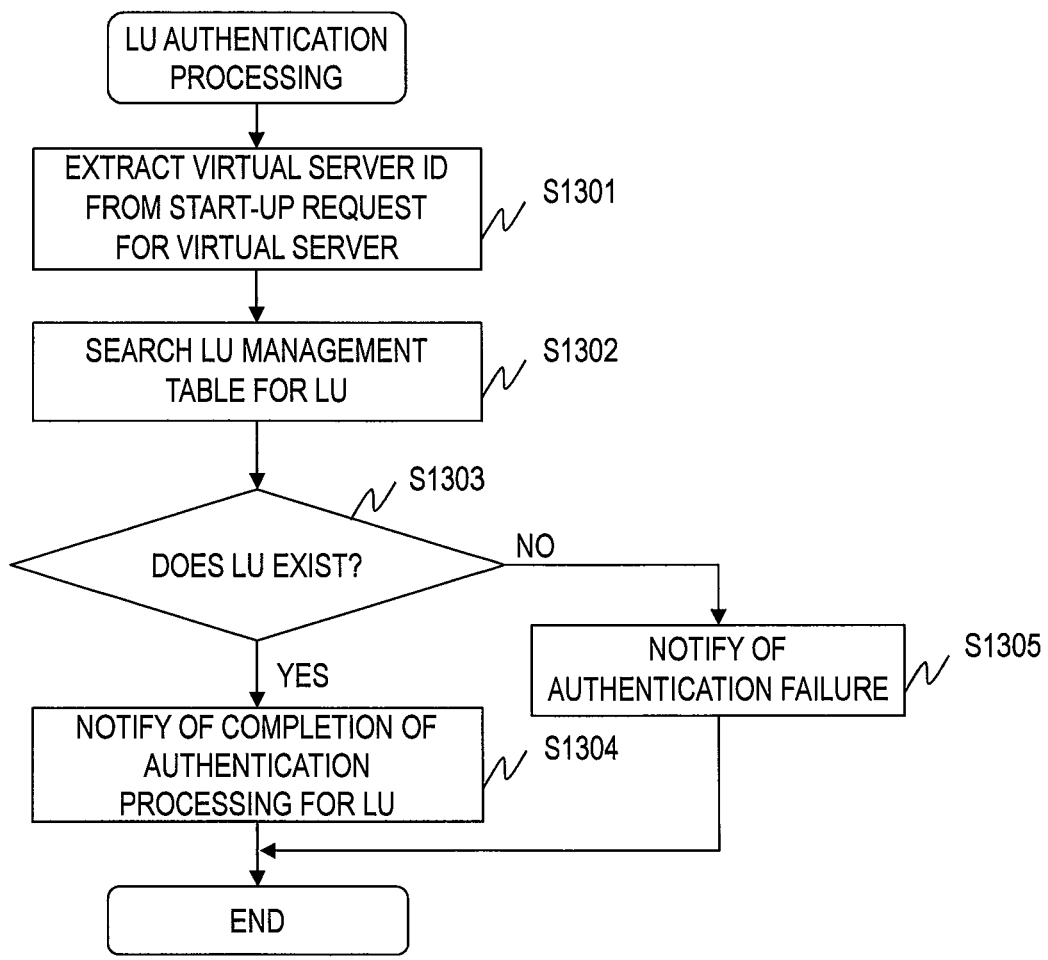
FIG. 13 is a flowchart illustrating details of authentication processing for an LU according to the first embodiment of this invention.

The LU authentication module 212 executes the authentication processing for a storage area storing an executable image of a subject virtual server 117. Referring to FIGS. 11A, 11B, and 13, a description is given later of the authentication processing for a storage area.

The start-up processing module 213 executes start-up processing for a virtual server 117.

It should be noted that the virtual server start-up module 112 may hold the start-up key authentication module 211, the LU authentication module 212, and the start-up processing module 213 as a single configuration.

The virtual server migration module 113 includes a start-up key transmission module 221, a start-up key reception module 222, and a migration processing module 223.

The start-up key transmission module 221 transmits a start-up key to a physical server 100 of a migration destination during the migration processing.

The start-up key reception module 222 receives a start-up key transmitted from a physical server 100 of a migration source.

The migration processing module 223 migrates a virtual server 117 operating on a physical server 100 of a migration source to a physical server 100 of a migration destination.

The start-up key management table 114, the LU management table 115, and the decoder 116 have the same configurations as those of FIG. 1, and a description thereof is therefore omitted.

Figure 3:
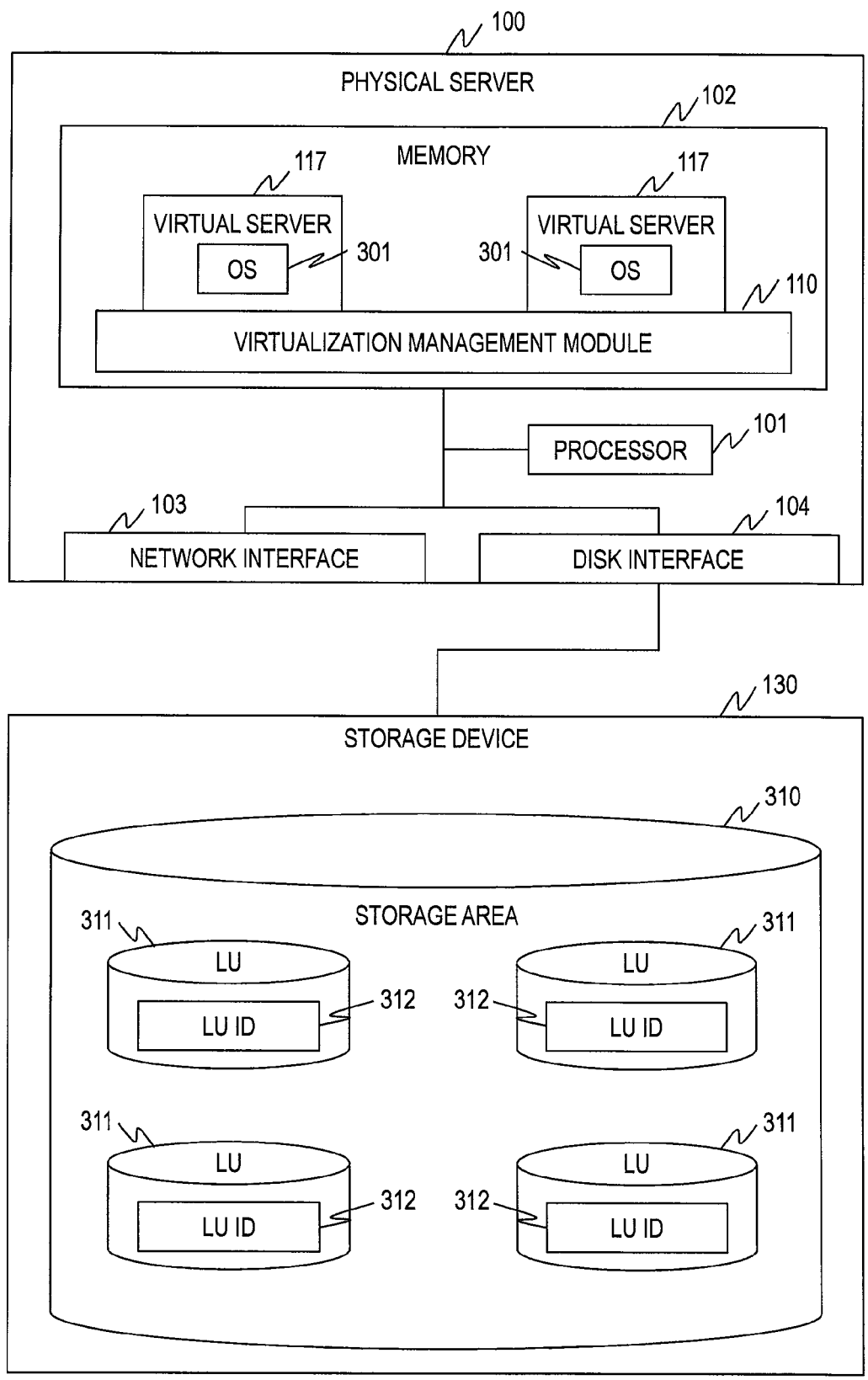
FIG. 3 is a block diagram illustrating a logical configuration of the computer system according to the first embodiment of this invention.

FIG. 3 is a block diagram illustrating a logical configuration of the computer system according to the first embodiment of this invention.

On the memory 102 of the physical server 100, the virtualization management module 110 is executed. On the virtualization management module 110, a plurality of virtual servers 117 operate. Further, on each of the virtual servers 117, the guest OS 301 is executed. As a result, a user can carry out his/her service.

The storage device 130 logically divides a storage area 310 of a disk array including a plurality of storage media 131 to generate a plurality of LUs 311. Moreover, the storage device 130 provides the virtual server 117 with an LU 311. To each of the LUs 311, an LU ID 312 for uniquely identifying the LU 311 is assigned.

According to this embodiment, one LU 311 is assigned to one virtual server 117. In other words, an executable image of the virtual server 117 including the guest OS 301 is stored in one LU 311.

The virtualization management module 110 starts the virtual server 117 by reading the executable image of the virtual server 117 from the LU 311 and executing the read executable image during the start-up processing.

FIG. 4 is an explanatory diagram illustrating details of the start-up key management table 114 according to the first embodiment of this invention.

The start-up key management table 114 includes virtual server IDs 401 and start-up keys 402.

The virtual server ID 401 is an identifier for uniquely identifying a virtual server 117 to be executed on a physical server 100.

The start-up key 402 stores a start-up key for the virtual server 117 corresponding to the virtual server ID 401.

The start-up key according to this embodiment is generated by using information specific to the virtualization management module 110. For example, the start-up key is generated based on hardware information on a physical server 100 on which the virtualization management module 110 is operating. As a result, the virtual server 117 can be prevented from being started on another virtualization management module 110.

According to this embodiment, the start-up key management table 114 is stored in a storage area which can be accessed only by the virtualization management module 110. In other words, the management server 120, other physical servers 100, and the guest OSs 301 cannot access the start-up key management table 114.

FIG. 5 is an explanatory diagram illustrating details of the LU management table 115 according to the first embodiment of this invention.

The LU management table 115 includes virtual server IDs 501 and LU IDs 502.

The virtual server ID 501 is an identifier for uniquely identifying a virtual server 117 operating on the physical server 100, and is the same information as the virtual server ID 401.

The LU ID 502 is an identifier for uniquely identifying an LU 311.

It should be noted that the virtualization management module 110 may combine the start-up key management table 114 and the LU management table 115 to hold the information as one table.

Figure 6:
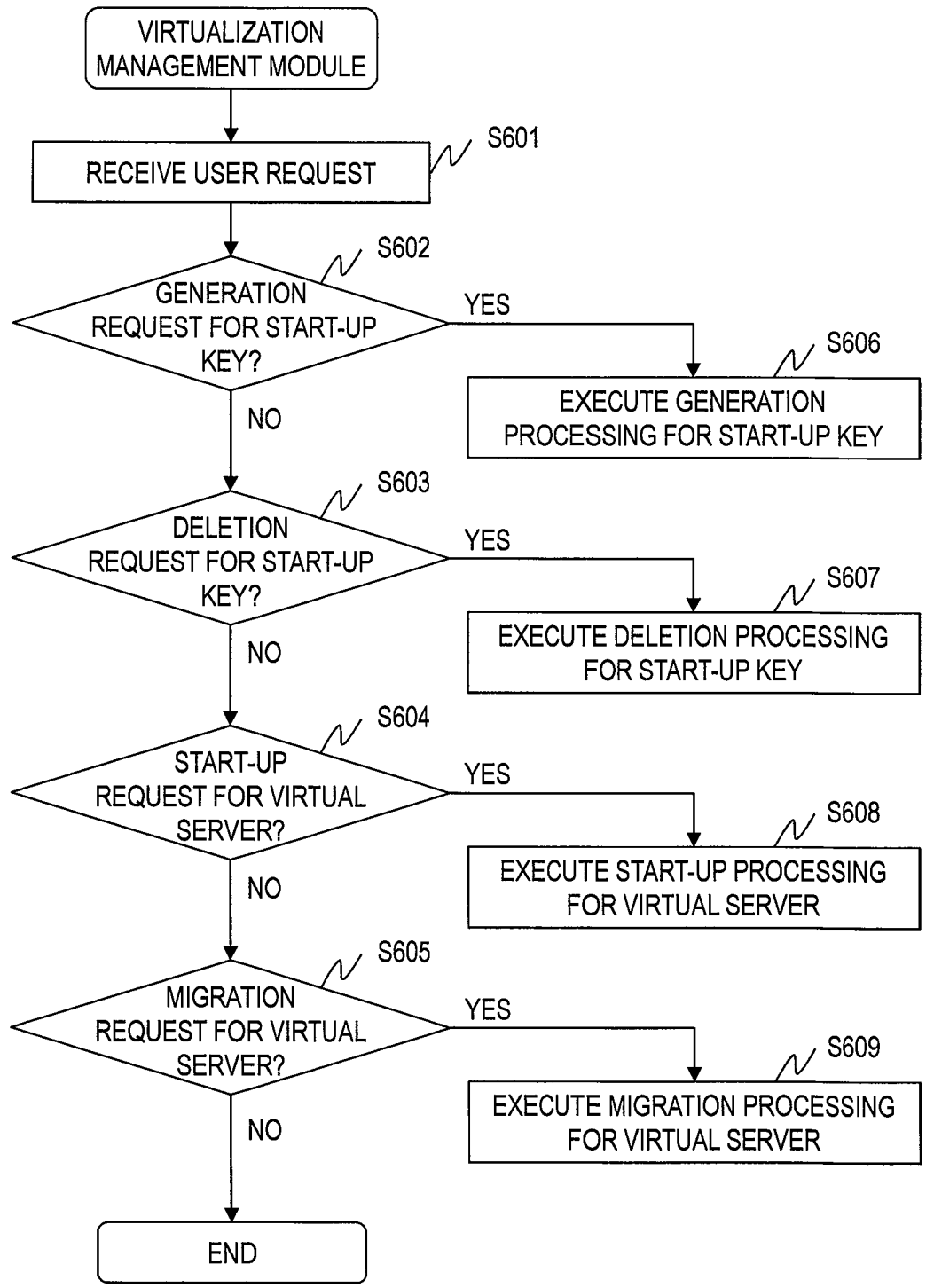
FIG. 6 is a flowchart illustrating an overview of processing to be executed in a case where the virtualization management module according to the first embodiment of this invention receives a user request.

FIG. 6 is a flowchart illustrating an overview of processing to be executed in a case where the virtualization management module 110 according to the first embodiment of this invention receives a user request.

The virtualization management module 110 receives a user request transmitted from the management server 120 (Step 601).

The virtualization management module 110 determines whether or not the received user request is a generation request for a start-up key (Step 602).

In a case where the virtualization management module 110 determines that the received user request is the generation request for a start-up key, the virtualization management module 110 executes the generation processing for a start-up key (Step 606). It should be noted that, referring to FIGS. 7 and 8, a detailed description is given later of the generation processing for a start-up key.

In a case where the virtualization management module 110 determines that the received user request is not the generation request for an start-up key, the virtualization management module 110 determines whether or not the received user request is a deletion request for an start-up key (Step 603).

In a case where the virtualization management module 110 determines that the received user request is the deletion request for a start-up key, the virtualization management module 110 executes the deletion processing for a start-up key (Step 607). It should be noted that, referring to FIGS. 9 and 10, a detailed description is given later of the deletion processing for a start-up key.

In a case where the virtualization management module 110 determines that the received user request is not the deletion request for an start-up key, the virtualization management module 110 determines whether or not the received user request is an start-up request for the virtual server 117 (Step 604).

In a case where the virtualization management module 110 determines that the received user request is the start-up request for the virtual server 117, the virtualization management module 110 executes the start-up processing for the virtual server 117 (Step 608). It should be noted that, referring to FIGS. 11A, 11B, 12, and 13, a detailed description is given later of the start-up processing for the virtual server 117.

In a case where the virtualization management module 110 determines that the received user request is not the start-up request for the virtual server 117, the virtualization management module 110 determines whether or not the received user request is a migration request for the virtual server 117 (Step 605).

In a case where the virtualization management module 110 determines that the received user request is the migration request for the virtual server 117, the virtualization management module 110 executes the migration processing for the virtual server 117 (Step 609). It should be noted that, referring to FIGS. 14, 15 and 16, a detailed description is given later of the migration processing for the virtual server 117.

In a case where the virtualization management module 110 determines that the received user request is not the migration request for the virtual server 117, the virtualization management module 110 finishes the processing. It should be noted that the virtualization management module 110 may execute other processing corresponding to the received user request.

A detailed description is now given of processing corresponding to the user request. First, a description is given of the generation processing for a start-up key.

FIG. 7 is a sequence diagram illustrating a flow of the generation processing for a start-up key according to the first embodiment of this invention.

An administrator or a user inputs the generation request for a start-up key into the management server 120 (Step 701). It should be noted that the generation request includes a virtual server ID.

Timings when the generation request for a start-up key is input may include a case where a new virtual server 117 is assigned to the user, and a case where a start-up key is newly generated for a virtual server 117 which has already been assigned to the user.

The management server 120 transmits the generation request for a start-up key including the virtual server ID to the virtualization management module 110. It should be noted that the management server 120 holds a table (not shown) for storing information on virtual servers 117 which operate on each physical server 100, and can identify a physical server 100 to which the generation request for a start-up key is to be transmitted by referring to the table.

In a case where the virtualization management module 110 receives the generation request for a start-up key from the management server 120 (Step 702), the virtualization management module 110 generates a start-up key (Step 703).

The virtualization management module 110 updates the start-up key management table 114 based on the generated start-up key (Step 704).

The virtualization management module 110 transmits a completion notification representing completion of the generation processing for the start-up key to the management server 120 (Step 705).

The management server 120 notifies the administrator or the user of the completion notification.

FIG. 8 is a flowchart illustrating details of the generation processing for a start-up key according to the first embodiment of this invention.

In a case where the virtualization management module 110 receives the generation request for a start-up key from the management server 120 (Step 801), the virtualization management module 110 invokes the start-up key processing module 111. The invoked start-up key processing module 111 executes the start-up key generation module 201. The following processing is executed by the start-up key generation module 201.

First, the start-up key generation module 201 generates a start-up key (Step 802).

As the generation method for a start-up key, for example, a method of obtaining a hash value from information specific to the virtualization management module 110 and generating a start-up key based on the hash value is conceivable. It should be noted that this invention is not limited by the generation method for a start-up key, and any method may be used.

Then, the start-up key generation module 201 encrypts the generated start-up key (Step 803). According to this embodiment, the start-up key is encrypted by using information specific to the virtualization management module 110.

As the encryption method, a method using the public-key cryptography such as the RSA cryptography is conceivable. It should be noted that this invention is not limited by the encryption method.

The start-up key generation module 201 updates the start-up key management table 114 based on the encrypted start-up key (Step 804).

Specifically, when an entry corresponding to the virtual server ID contained in the generation request for the start-up key exists in the start-up key management table 114, the start-up key generation module 201 updates a column for the start-up key 402 of the entry. Moreover, when an entry corresponding to the virtual server ID contained in the generation request for the start-up key does not exist in the start-up key management table 114, the start-up key generation module 201 newly adds an entry.

The start-up key generation module 201 transmits a completion notification for the generation processing for the start-up key to the management server 120 (Step 805), and finishes the processing.

According to this invention, the start-up key is generated by using the information specific to the virtualization management module 110, and further, the start-up key is encrypted by using the information specific to the virtualization management module 110. As a result, even when the executable image of the virtual server 117 is illegally obtained, other virtualization management modules 110 cannot decrypt the start-up key, and further, the virtual server 117 cannot be started due to a difference in start-up key. Therefore, the security can be enhanced.

Now, a description is given of the deletion processing for a start-up key.

FIG. 9 is a sequence diagram illustrating a flow of the deletion processing for a start-up key according to the first embodiment of this invention.

The administrator or the user inputs a deletion request for a start-up key into the management server 120 (Step 901). It should be noted that the deletion request includes a virtual server ID.

Timings when the deletion request for the start-up key is input may include a case where a virtual server 117 assigned to a user is to be deleted.

The management server 120 transmits the deletion request for a start-up key including the virtual server ID to the virtualization management module 110. It should be noted that the management server 120 holds the table (not shown) for storing the information on the virtual servers 117 which operate on each physical server 100, and can identify a physical server 100 to which the deletion request for an start-up key is to be transmitted by referring to the table.

In a case where the virtualization management module 110 receives the deletion request for the start-up key from the management server 120 (Step 902), the virtualization management module 110 searches for the start-up key (Step 903).

The virtualization management module 110 deletes information corresponding to the retrieved start-up key from the start-up key management table 114 (Step 904).

The virtualization management module 110 transmits a completion notification representing completion of the deletion of the start-up key to the management server 120 (Step 905).

The management server 120 notifies the administrator or the user of the completion notification.

FIG. 10 is a flowchart illustrating details of the deletion processing for a start-up key according to the first embodiment of this invention.

In a case where the virtualization management module 110 receives the deletion request for a start-up key from the management server 120 (Step 1001), the virtualization management module 110 invokes the start-up key processing module 111. The invoked start-up key processing module 111 executes the start-up key deletion module 202. The following processing is executed by the start-up key deletion module 202.

First, the start-up key deletion module 202 searches for the start-up key from the start-up key management table 114, based on the virtual server ID included in the received deletion request for the start-up key (Step 1002). Specifically, the start-up key deletion module 202 searches for an entry, matching the virtual server ID included in the deletion request for the start-up key, from the start-up key management table 114.

The start-up key deletion module 202 deletes the retrieved start-up key from the start-up key management table 114 (Step 1003). Specifically, the start-up key deletion module 202 deletes the entry matching the virtual server ID included in the deletion request for the start-up key from the start-up key management table 114.

The start-up key deletion module 202 transmits a completion notification for the deletion processing for the start-up key to the management server 120 (Step 1004), and finishes the processing.

Now, a description is given of the start-up processing for a virtual server.

FIG. 11A is a sequence diagram illustrating a flow of the start-up processing for a virtual server according to the first embodiment of this invention.

The administrator or the user inputs a start-up request for a virtual server 117 into the management server 120 (Step 1101). It should be noted that the start-up request includes a virtual server ID.

The virtual server 117 to be started is hereinafter also referred to as subject virtual server 117.

The management server 120 transmits the start-up request for a virtual server including the virtual server ID to the virtualization management module 110. It should be noted that the management server 120 holds the table (not shown) for storing the information on the virtual servers 117 which operate on each physical server 100, and can identify a physical server 100 to which the start-up request for a virtual server is to be transmitted by referring to the table.

In a case where the virtualization management module 110 receives the start-up request for a virtual server 117 from the management server 120 (Step 1102), the virtualization management module 110 determines, by search, whether or not a corresponding start-up key exists (Step 1103). In other words, the authentication processing for the start-up key is executed.

Then, the virtualization management module 110 determines, by search, whether or not a corresponding LU exists (Step 1104). In other words, the authentication processing for the LU is executed.

The virtualization management module 110 starts up the subject virtual server 117 corresponding to the virtual server ID included in the start-up request for the virtual server 117 (Step 1105).

Specifically, after the authentication processing for the LU has been completed, the virtualization management module 110 reads an executable image of the virtual server 117 from the LU 311, and executes the read executable image of the virtual server 117.

The virtualization management module 110 transmits a completion notification representing completion of the start-up processing for the virtual server to the management server 120 (Step 1106).

The management server 120 notifies the administrator or the user of the completion notification.

FIG. 11B is a sequence diagram illustrating a flow of the start-up processing in a case where a start-up key for a virtual server 117 is not used according to the first embodiment of this invention.

As illustrated in FIG. 11B, in a case where a start-up key is not used, the authentication processing for a start-up key in Step 1103 is not executed.

The other processing is the same, and a description thereof is therefore omitted.

FIG. 12 is a flowchart illustrating details of the authentication processing for a start-up key according to the first embodiment of this invention.

In a case where the virtualization management module 110 receives the start-up request for a start-up key from the management server 120, the virtualization management module 110 invokes the server start-up module 112. The invoked virtual server start-up module 112 executes the start-up key authentication module 211. The following processing is executed by the start-up key authentication module 211.

The start-up key authentication module 211 extracts a virtual server ID from the received start-up request for a virtual server (Step 1201).

The start-up key authentication module 211 refers to the start-up key management table 114 based on the extracted virtual server ID to search for a start-up key (Step 1202). Specifically, the start-up key authentication module 211 searches for an entry, matching the extracted virtual server ID, from the start-up key management table 114.

The start-up key authentication module 211 determines whether or not a start-up key corresponding to the extracted virtual server ID exists as a result of the search (Step 1203). In other words, it is determined whether or not an entry matching the extracted virtual server ID exists in the start-up key management table 114.

In a case where the start-up key authentication module 211 determines that a start-up key corresponding to the extracted virtual server ID does not exist, the start-up key authentication module 211 notifies the virtual server start-up module 112 of the failure in the authentication (Step 1206), and finishes the processing. In other words, the virtual server 117 is not started.

In a case where the start-up key authentication module 211 determines that a start-up key corresponding to the extracted virtual server ID exists, the start-up key authentication module 211 reads the start-up key from the start-up key management table 114, and determines whether or not the read start-up key can be decrypted (Step 1207).

Specifically, the decoder 116 is executed to determine whether or not the read start-up key can be decrypted.

On this occasion, the start-up key is encrypted based on the information specific to the virtualization management module 110, and hence a different virtualization management module 110 cannot decrypt the start-up key. In other words, even if the start-up key is illegally obtained, in a case where the obtained start-up key cannot be decrypted, the virtual server 117 is restrained from being started.

In a case where the start-up key authentication module 211 determines that the read start-up key cannot be decrypted, the start-up key authentication module 211 notifies the virtual server start-up module 112 of the failure in the authentication (Step 1206), and finishes the processing. In other words, the virtual server 117 is not started.

In a case where the start-up key authentication module 211 determines that the read start-up key can be decrypted, the start-up key authentication module 211 notifies the virtual server start-up module 112 of the completion of the authentication processing for the start-up key (Step 1205), and finishes the processing.

As described above, according to this embodiment, in a case where a start-up key corresponding to a virtual server 117 does not exist, the virtual server 117 is not started.

FIG. 13 is a flowchart illustrating details of the authentication processing for an LU according to the first embodiment of this invention.

In a case where the virtual server start-up module 112 receives the notification of the completion of the authentication processing for a start-up key, the virtual server start-up module 112 executes the LU authentication module 212. The following processing is executed by the LU authentication module 212.

The LU authentication module 212 extracts a virtual server ID from the received start-up request for a virtual server (Step 1301).

The LU authentication module 212 refers to the LU management table 115 based on the extracted virtual server ID, and searches for an LU 311 corresponding to the extracted virtual server ID (Step 1302). Specifically, the LU authentication module 212 searches for an entry, matching the extracted virtual server ID, from the LU management table 115.

The LU authentication module 212 determines whether or not, as a result of the search, an LU 311 corresponding to the extracted virtual server ID exists (Step 1303). In other words, it is determined whether or not an entry matching the extracted virtual server ID exists in the LU management table 115.

In a case where the LU authentication module 212 determines that an LU 311 corresponding to the extracted virtual server ID does not exist, the LU authentication module 212 notifies the virtual server start-up module 112 of the failure in the authentication (Step 1306), and finishes the processing. In other words, the virtual server 117 is not started.

When the LU authentication module 212 determines that an LU 311 corresponding to the extracted virtual server ID exists, the LU authentication module 212 notifies the virtual server start-up module 112 of completion of the authentication processing for the LU (Step 1305), and finishes the processing.

Now, a description is given of the migration processing for a virtual server.

Figure 14:
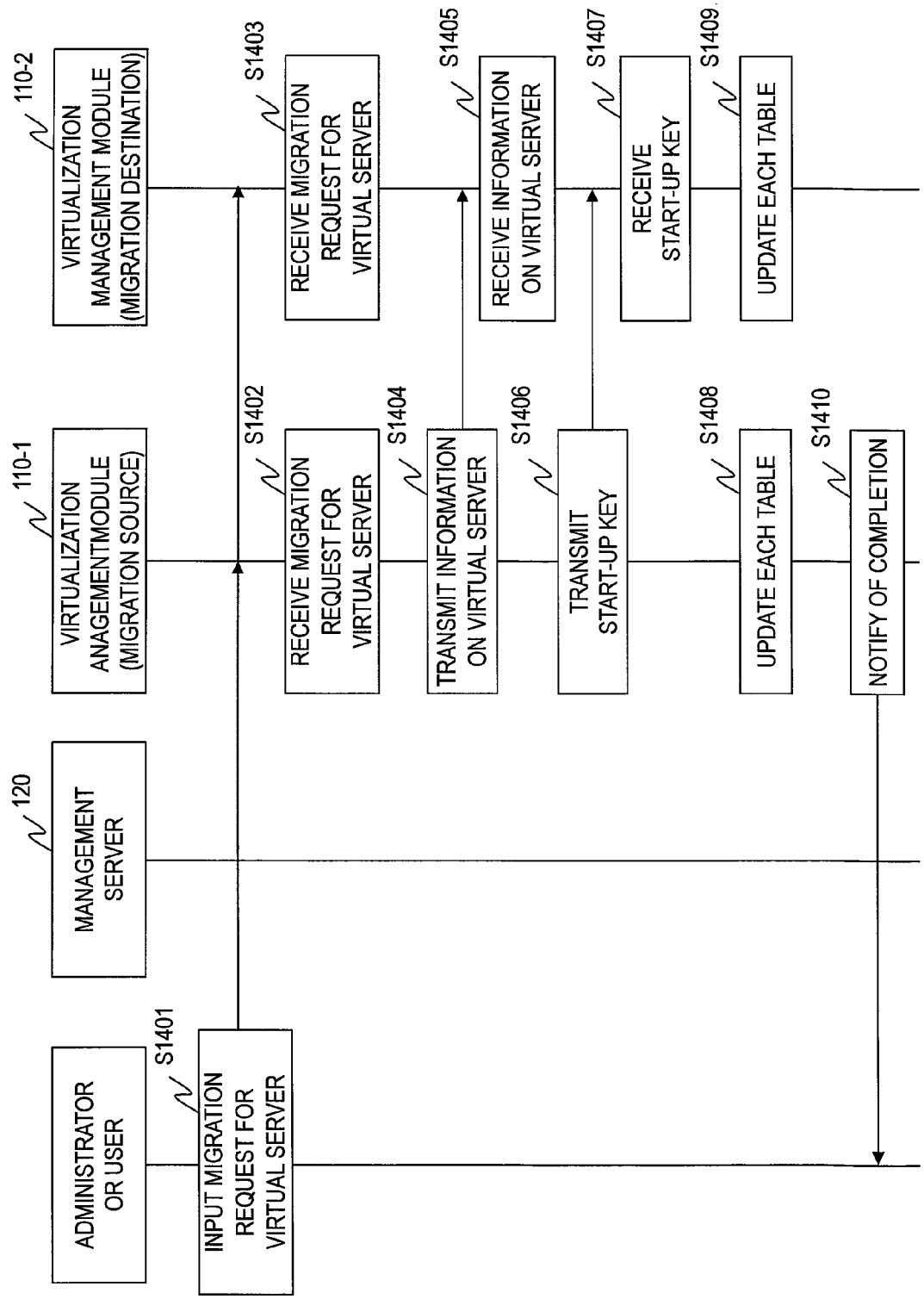
FIG. 14 is a sequence diagram illustrating a flow of migration processing for a virtual server according to the first embodiment of this invention.

FIG. 14 is a sequence diagram illustrating a flow of the migration processing for a virtual server 117 according to the first embodiment of this invention.

In the migration processing for a virtual server, the virtualization management module 110 of the physical server 100 of a migration source and the virtualization management module 110 of the physical server 100 of a migration destination cooperate to execute the processing.

The virtualization management module 110 of the physical server 100 of the migration source is hereinafter referred to as virtualization management module 110-1, and the virtualization management module 110 of the physical server 100 of the migration destination is hereinafter referred to as virtualization management module 110-2.

The administrator or the user inputs the virtual server ID and identification information on the physical server 100 of the migration destination into the management server 120, and transmits a migration request for the virtual server 117 (Step 1401).

It should be noted that timings when the migration request for the virtual server 117 is input can include a planned migration and a failure occurrence.

The management server 120 transmits the migration request for the virtual server 117 to the virtualization management modules 110-1 and 110-2.

It should be noted that the management server 120 holds the table (not shown) for storing the information on the virtual servers 117 operating on the respective physical servers 100, and can identify the physical server 100 to which the migration request for the virtual server 117 is to be transmitted by referring to the table. Moreover, the management server 120 holds a table (not shown) for managing identification information on the physical servers 100, and can identify the physical server 100 to which the migration request for the virtual server 117 is to be transmitted by referring to the table.

As a communication method performed between the virtualization management modules 110-1 and 110-2, the following methods are conceivable.

For example, a method of generating, by the management server 120, a communication path coupling the virtualization management modules 110-1 and 110-2 to each other so that the virtualization management modules 110-1 and 110-2 use the communication path to transmit/receive information to/from each other is conceivable.

Moreover, the virtualization management modules 110-1 and 110-2 may transmit/receive information to/from each other via the management server 120. In this case, the information transmitted/received between the virtualization management modules 110-1 and 110-2 is preferably encrypted.

Referring back to FIG. 14, a description is given.

In a case where the virtualization management module 110-1 receives the migration request for the virtual server 117 from the management server 120 (Step 1402), the virtualization management module 110-1 transmits information relating to the virtual server 117 to be migrated to the virtualization management module 110-2 of the migration destination (Step 1404).

The information relating to the virtual server 117 to be migrated is hereinafter referred to as migration information. The migration information includes configuration information on the virtual server 117 to be migrated, and an executable image of the virtual server 117 to be migrated. It should be noted that the migration information may include other information.

The virtualization management module 110-2 receives the migration request for the virtual server 117 from the management server 120 (Step 1403). Moreover, the virtualization management module 110-2 receives the migration information from the virtualization management module 110-1 (Step 1405).

The virtualization management module 110-2 generates a virtual server 117 based on the received migration information. Moreover, the virtualization management module 110-2 stores the executable image of the virtual server 117 in an LU 311.

It should be noted that a virtual server 117 may not be newly generated in a case where a virtual server 117 having the same configuration as the virtual server 117 of the migration source has been generated on the physical server 100 of the migration destination. In this case, the virtual server 117 generated on the physical server 100 of the migration destination and the virtual server ID only needs to be associated with each other.

Then, the virtualization management module 110-1 reads a start-up key corresponding to the virtual server 117 to be migrated from the start-up key management table 114, and transmits the read start-up key to the virtualization management module 110-2 (Step 1406).

After the virtualization management module 110-1 transmits the start-up key, the virtualization management module 110-1 updates the start-up key management table 114 and the LU management table 115 (Step 1408). Specifically, the virtualization management module 110-1 deletes entries corresponding to the virtual server 117 that has been migrated from the start-up key management table 114 and the LU management table 115.

In a case where the virtualization management module 110-2 receives the start-up key (Step 1407), the virtualization management module 110-2 updates the start-up key management table 114 and the LU management table 115 (Step 1409). Specifically, the virtualization management module 110-2 adds entries corresponding to the virtual server 117 that has been migrated to the start-up key management table 114 and the LU management table 115.

The virtualization management module 110-1 transmits a completion notification representing completion of the migration processing for the virtual server 117 to the management server 120 (Step 1410).

It should be noted that, as the timing when the completion notification is transmitted, the virtualization management module 110-1 transmits the completion notification after the notification that the setting of the virtual server 117 is completed is received from the virtualization management module 110-2. Moreover, the virtualization management module 110-2 may transmit the completion notification to the management server 120.

The management server 120 notifies the administrator or the user of the completion notification.

Figure 15:
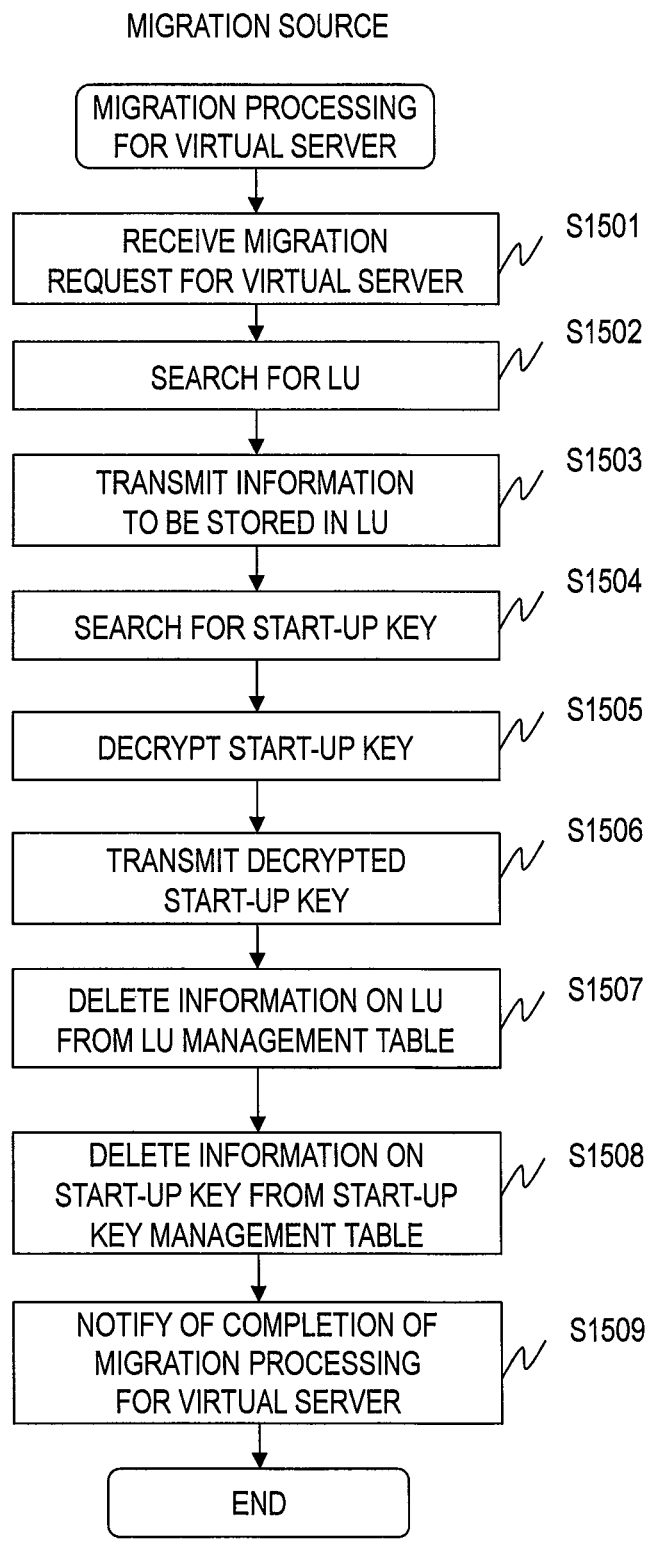
FIG. 15 is a flowchart illustrating details of processing executed by the virtualization management module of a migration source according to the first embodiment of this invention.

FIG. 15 is a flowchart illustrating details of processing executed by the virtualization management module 110-1 of the migration source according to the first embodiment of this invention.

In a case where the virtualization management module 110-1 receives from the management server 120 the migration request for the virtual server 117 including the virtual server ID (Step 1501), the virtualization management module 110-1 starts the virtual server migration module 113. The following processing is executed by the virtual server migration module 113.

First, the virtual server migration module 113 executes the migration processing module 223.

The migration processing module 223 searches for an LU 311 that stores the executable image of the virtual server 117 to be migrated (Step 1502).

Specifically, the migration processing module 223 extracts a virtual server ID from the migration request for the virtual server 117. The migration processing module 223 refers to the LU management table 115 based on the extracted virtual server ID, and searches for an entry matching the extracted virtual server ID.

Moreover, the migration processing module 223 obtains the configuration information on the virtual server 117 to be migrated.

Then, the migration processing module 223 reads the executable image of the virtual server 117 stored in the retrieved LU 311, and transmits, to the virtualization management module 110-2 of the migration destination, the migration information including the read executable image of the virtual server 117 (Step 1503).

When the above-mentioned processing is finished, the virtual server migration module 113 then executes the start-up key transmission module 221.

First, the start-up key transmission module 221 searches for a start-up key corresponding to the virtual server 117 to be migrated (Step 1504).

Specifically, the start-up key transmission module 221 extracts a virtual server ID from the migration request for the virtual server 117. The start-up key transmission module 221 refers to the start-up key management table 114 based on the extracted virtual server ID, and searches for an entry matching the extracted virtual server ID.

The start-up key transmission module 221 reads the start-up key from the start-up key management table 114, and decrypts the read start-up key (Step 1505). It should be noted that the decoder 116 is used for the decryption.

The start-up key transmission module 221 transmits the decrypted start-up key to the virtualization management module 110-2 of the migration destination (Step 1506).

In a case where the above-mentioned processing has been completed, the virtual server migration module 113 deletes an entry corresponding to the virtual server 117 that has been migrated from the LU management table 1507 (Step 1507), and deletes an entry corresponding to the virtual server 117 that has been migrated from the start-up key management table 114 (Step 1508).

The virtual server migration module 113 transmits a completion notification for the migration processing for the virtual server 117 to the management server 120 (Step 1509), and finishes the processing.

Figure 16:
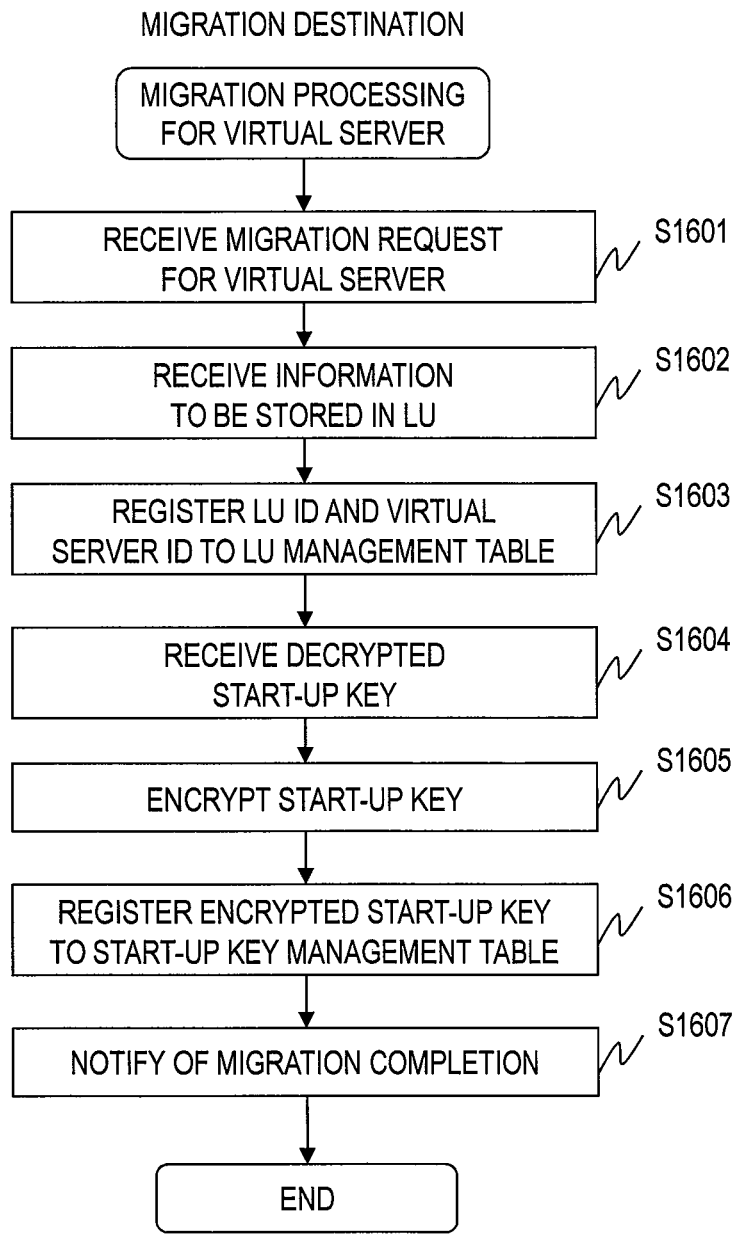
FIG. 16 is a flowchart illustrating details of processing executed by the virtualization management module of a migration destination according to the first embodiment of this invention.

FIG. 16 is a flowchart illustrating details of processing executed by the virtualization management module 110-2 of the migration destination according to the first embodiment of this invention.

In a case where the virtualization management module 110-2 of the migration destination receives from the management server 120 the migration request for the virtual server 117 including the virtual server ID (Step 1601), the virtualization management module 110-2 executes the virtual server migration module 113. The following processing is executed by the virtual server migration module 113.

In a case where the virtual server migration module 113 receives the migration information including the executable image of the virtual server 117 from the virtualization management module 110-1 of the migration source (Step 1602), the virtual server migration module 113 executes the migration processing module 223. The migration processing module 223 stores the executable image of the virtual server 117 included in the received migration information in an LU 311.

The migration processing module 223 associates the virtual server ID included in the migration request for the virtual server 117, and the LU ID of the LU 311 storing the executable image of the virtual server 117 with each other, and registers the virtual server ID and the LU ID associated with each other to the LU management table 115 (Step 1603).

Then, the virtual server migration module 113 receives the start-up key for the virtual server 117 to be migrated from the virtualization management module 110-1 by executing the start-up key reception module 222 (Step 1604). It should be noted that the received start-up key is the decrypted start-up key.

The virtual server migration module 113 encrypts the start-up key (Step 1605). As the method for encryption, the same method as in Step 803 is may be employed.

The virtual server migration module 113 registers the virtual server ID included in the migration request for the virtual server 117 and the encrypted start-up key that are associated with each other to the start-up key management table 114 (Step 1606).

The virtual server migration module 113 notifies the virtualization management module 110-1 of the migration completion (Step 1607), and finishes the processing.

As described above, the start-up key is encrypted also in the virtualization management module 110 of the migration destination. Thus, other virtualization management modules 110 cannot decrypt the start-up key, and hence cannot start the virtual server 117.

According to the first embodiment of this invention, the virtualization management module 110 can start a virtual server 117 only when the virtualization management module 110 holds a start-up key required to start the virtual server 117. As a result, a virtual server 117 is restrained from being started on a virtualization management module 110 that does not hold a corresponding start-up key. Thus, it is possible to restrain a malicious administrator or the like from starting an executable image of the virtual server 117 on other physical server 100.

Moreover, the start-up key is stored in the storage area that can be accessed only by the virtualization management module 110, and hence cannot be acquired from the outside such as the management server 120.

Further, even if the virtualization management module 110 holds a start-up key, when the virtualization management module 110 cannot decrypt the start-up key, the virtual server 117 is restrained from being started. As a result, the security can be enhanced more.

Second Embodiment

A second embodiment is different in such a point that the executable image of the virtual server 117 stored in the LU is further encrypted by using the start-up key. In the following, a description is mainly given of the difference from the first embodiment.

Configurations of the computer system, the physical servers 100, the management server 120, and the storage device 130 of the second embodiment are the same as those of the first embodiment, and a description thereof is therefore omitted.

According to the second embodiment, the generation processing for a start-up key, the authentication processing for the start-up key, and the authentication processing for an LU are different.

Figure 17:
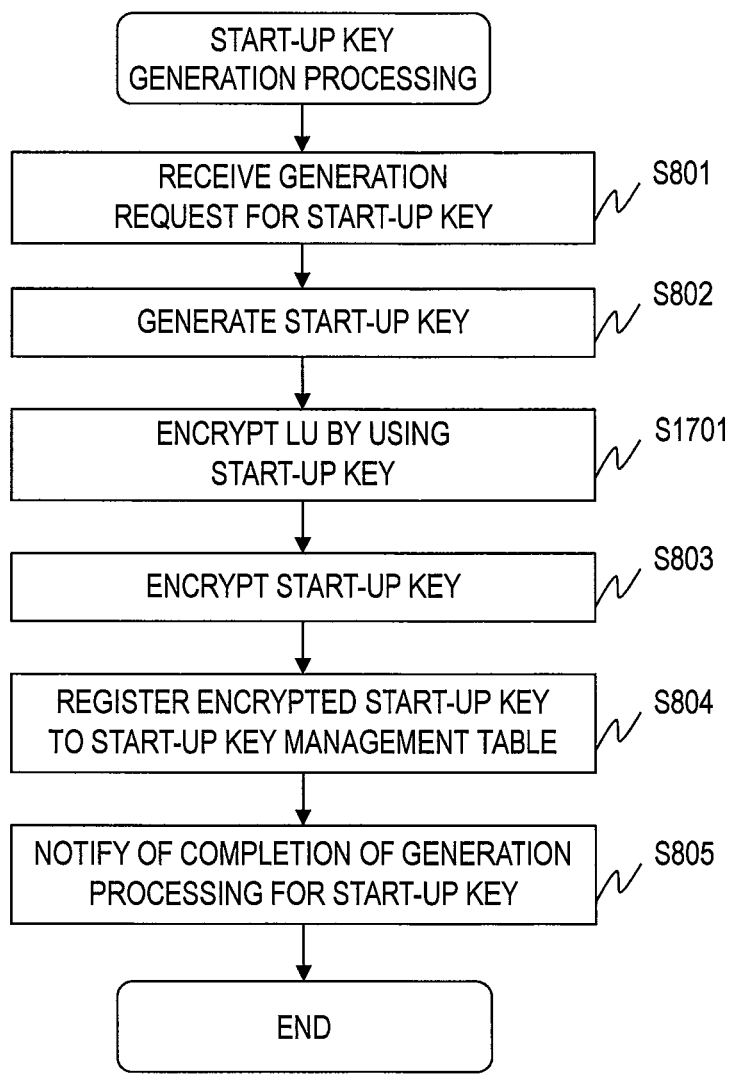
FIG. 17 is a flowchart illustrating details of the generation processing for a start-up key according to the second embodiment of this invention.

FIG. 17 is a flowchart illustrating details of the generation processing for a start-up key according to the second embodiment of this invention.

Processing in Steps 801 to 805 is the same as that of the first embodiment, and a description thereof is therefore omitted. According to the second embodiment, new processing is executed after Step 802.

After the start-up key generation module 201 generates the start-up key, the start-up key processing module 111 encrypts the LU 311 storing the executable image of the virtual server 117 by using the generated start-up key (Step 1701). For example, a method of encrypting the LU 311 while the start-up key is used as an encryption key is conceivable.

Then, the start-up key generation module 201 continues the processing.

Figure 18:
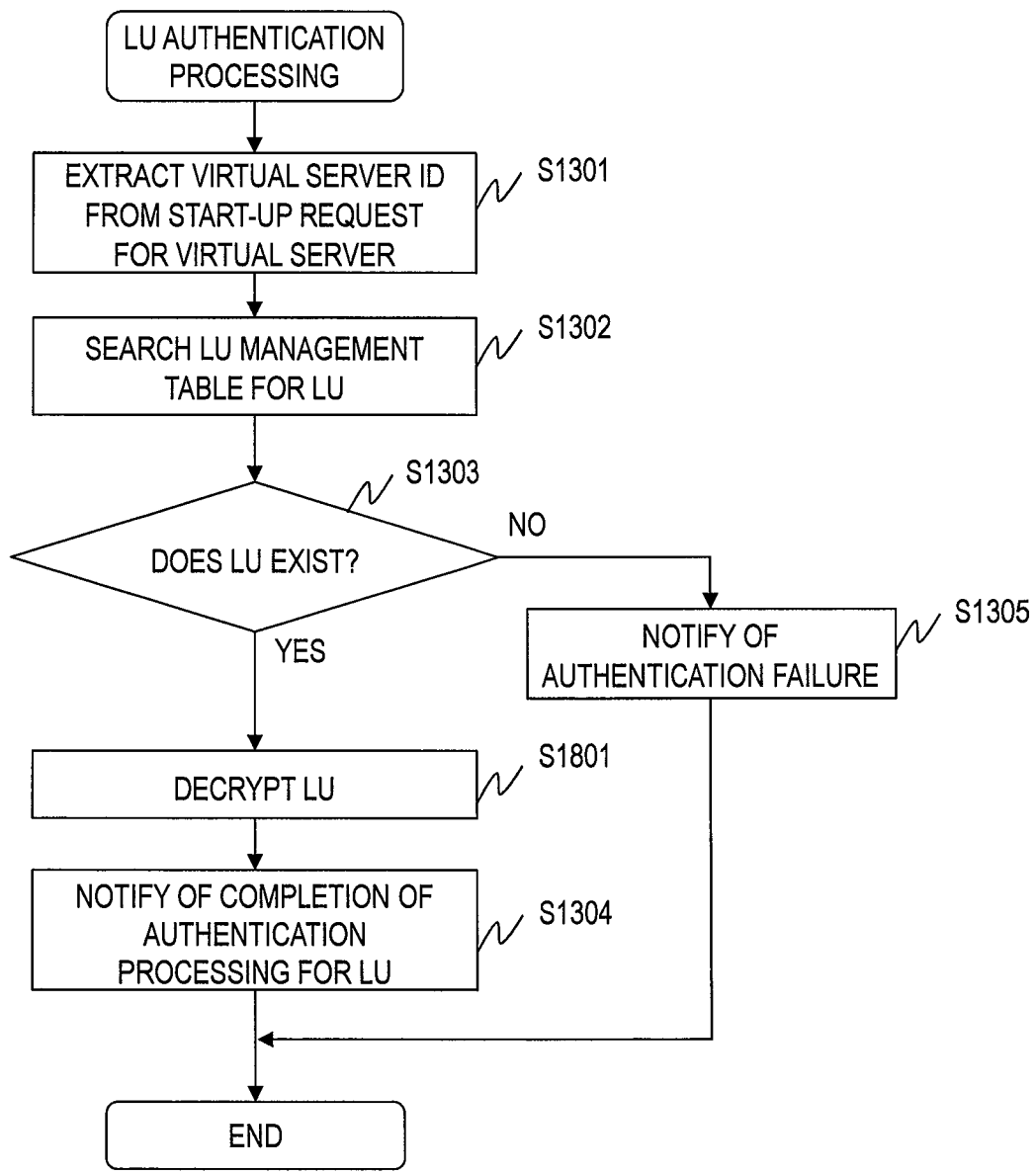
FIG. 18 is a flowchart illustrating details of the authentication processing for an LU according to the second embodiment of this invention.

FIG. 18 is a flowchart illustrating details of the authentication processing for an LU according to the second embodiment of this invention.

Processing in Steps 1301 to 1305 is the same as that of the first embodiment, and a description thereof is therefore omitted. According to the second embodiment, new processing is executed after Step 1303.

In Step 1303, in a case where the LU authentication module 212 determines that an LU 311 corresponding to the extracted virtual server ID exists, the LU authentication module 212 reads the start-up key from the start-up key management table 114 to use the read start-up key to decrypt the corresponding LU 311 (Step 1801).

Figure 19:
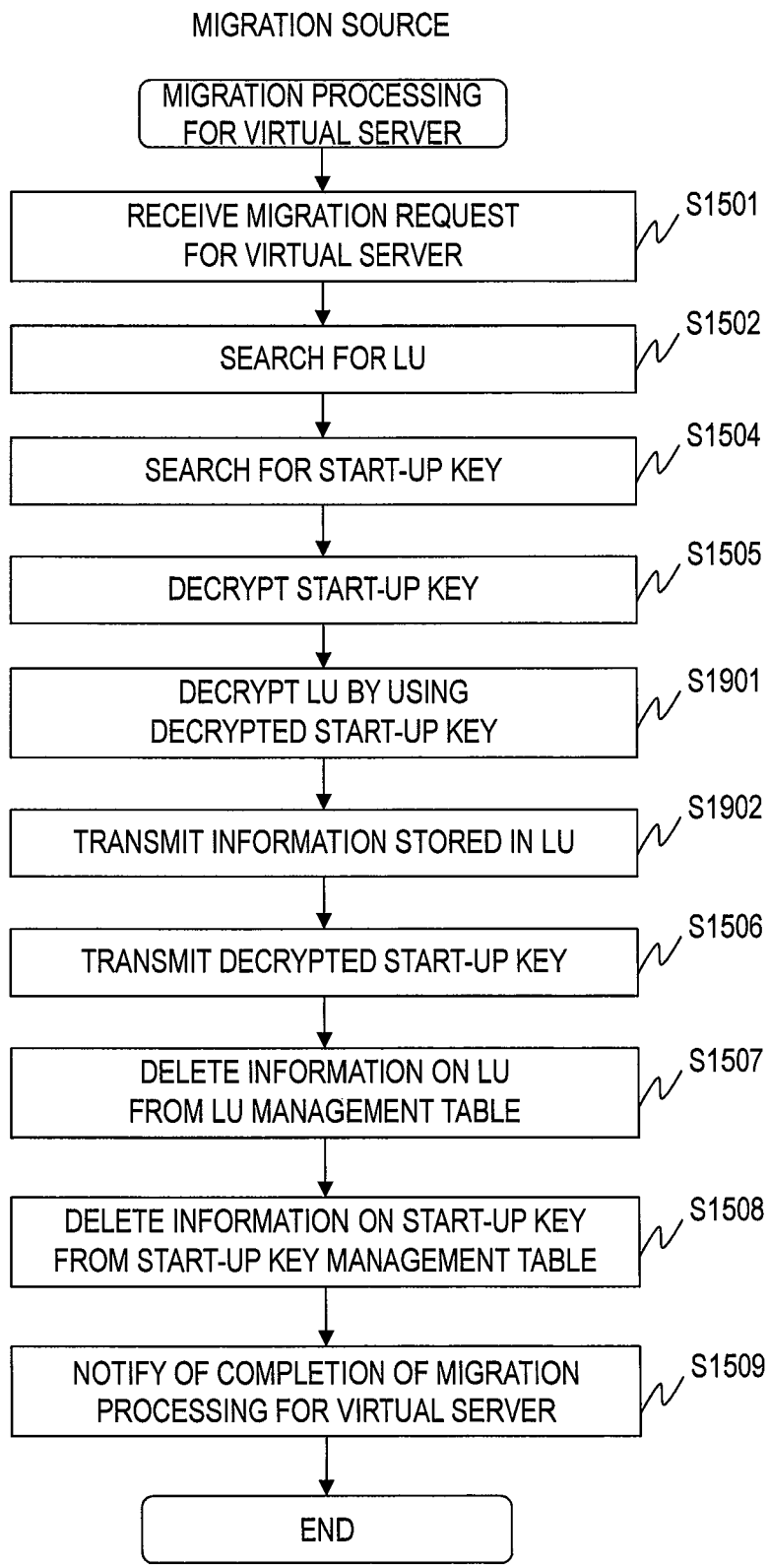
FIG. 19 is a flowchart illustrating details of processing executed by the virtualization management module of the migration source according to the second embodiment of this invention.

FIG. 19 is a flowchart illustrating details of processing executed by the virtualization management module 110-1 of the migration source according to the second embodiment of this invention.

Processing in Steps 1501, 1502, and 1504 to 1509 is the same as that of the first embodiment, and hence a description thereof is omitted.

According to the second embodiment, the start-up key is searched for (Step 1504) after the LU 311 is searched for (Step 1502). This is executed to decrypt the encrypted LU 311.

After Step 1505, the migration processing module 223 decrypts the LU 311 storing the executable image of the virtual server 117 to be migrated by using the decrypted start-up key (Step 1901).

Then, the migration processing module 223 reads the executable image of the virtual server 117 stored in the decrypted LU 311, and transmits the migration information including the read executable image of the virtual server 117 to the virtualization management module 110-2 of the migration destination (Step 1902).

It should be noted that the migration processing module 223 may transmit the encrypted executable image itself of the virtual server 117 to the virtualization management module 110-2 of the migration destination.

Figure 20:
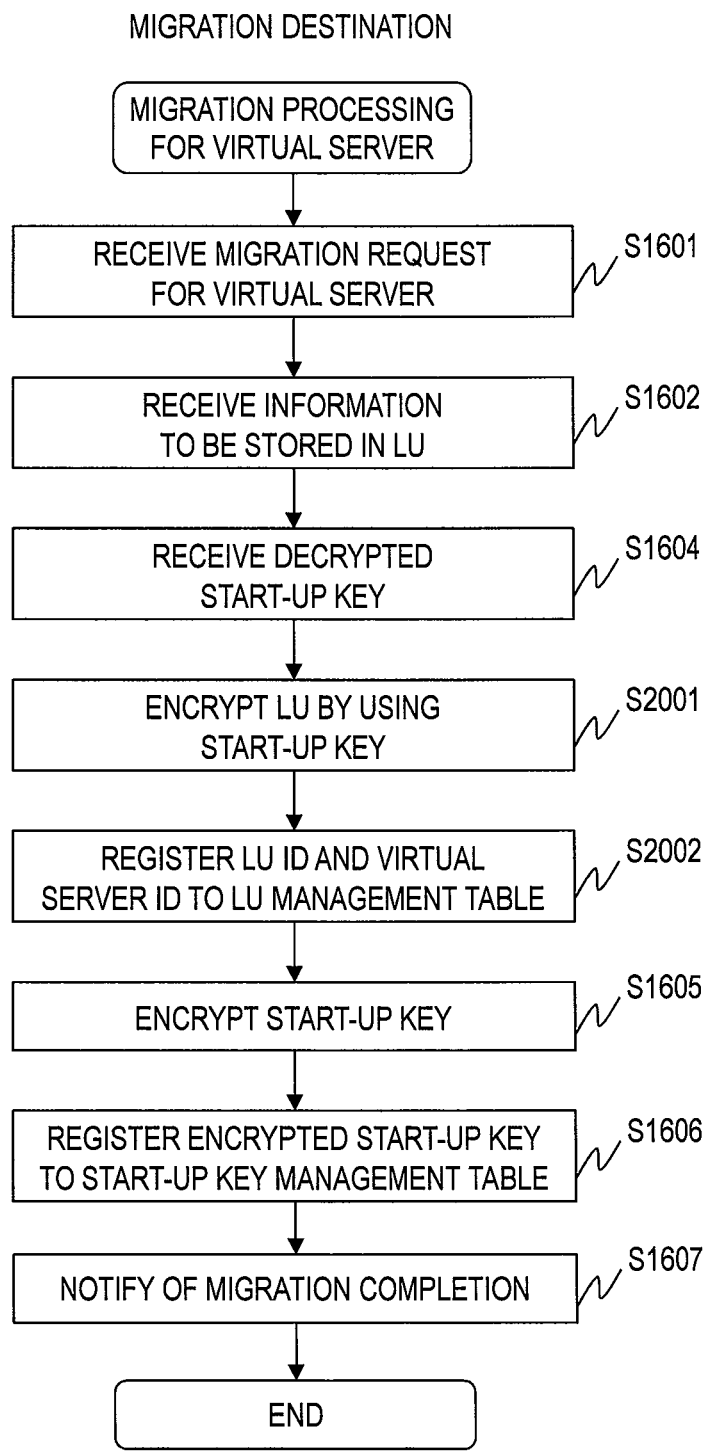
FIG. 20 is a flowchart illustrating details of processing executed by the virtualization management module of the migration destination according to the second embodiment of this invention.

FIG. 20 is a flowchart illustrating details of processing executed by the virtualization management module 110-2 of the migration destination according to the second embodiment of this invention.

Processing in Steps 1601, 1602, 1604, and 1605 to 1607 is the same as that of the first embodiment, and hence a description thereof is omitted.

After the migration processing module 223 receives the executable image of the virtual server 117 and the decrypted start-up key (Steps 1602 and 1604), the migration processing module 223 encrypts the LU 311 storing the executable image of the virtual server 117 by using the received start-up key (Step 2001).

The migration processing module 223 associates the virtual server ID included in the migration request for the virtual server 117 and the LU ID of the LU 311 storing the executable image of the virtual server 117 with each other, and registers the virtual server ID and the LU ID that are associated with each other to the LU management table 115 (Step 2002).

According to the second embodiment, the security can further be enhanced by the virtualization management module 110 using the start-up key to encrypt the executable image itself of the virtualization server 117.

Third Embodiment

A third embodiment is different in such a point that, in the migration processing, the virtualization management module 110 of the migration source transmits a generation command for a start-up key to the virtualization management module 110 of the migration destination. In other words, during the migration processing, the start-up key is not transmitted to the virtualization management module 110 of the migration destination, but the virtualization management module 110 of the migration destination newly generates the start-up key. In the following, a description is mainly given of the difference from the first embodiment.

Configurations of the computer system, the physical servers 100, the management server 120, and the storage device 130 of the third embodiment are the same as those of the first embodiment, and a description thereof is therefore omitted.

Figure 21:
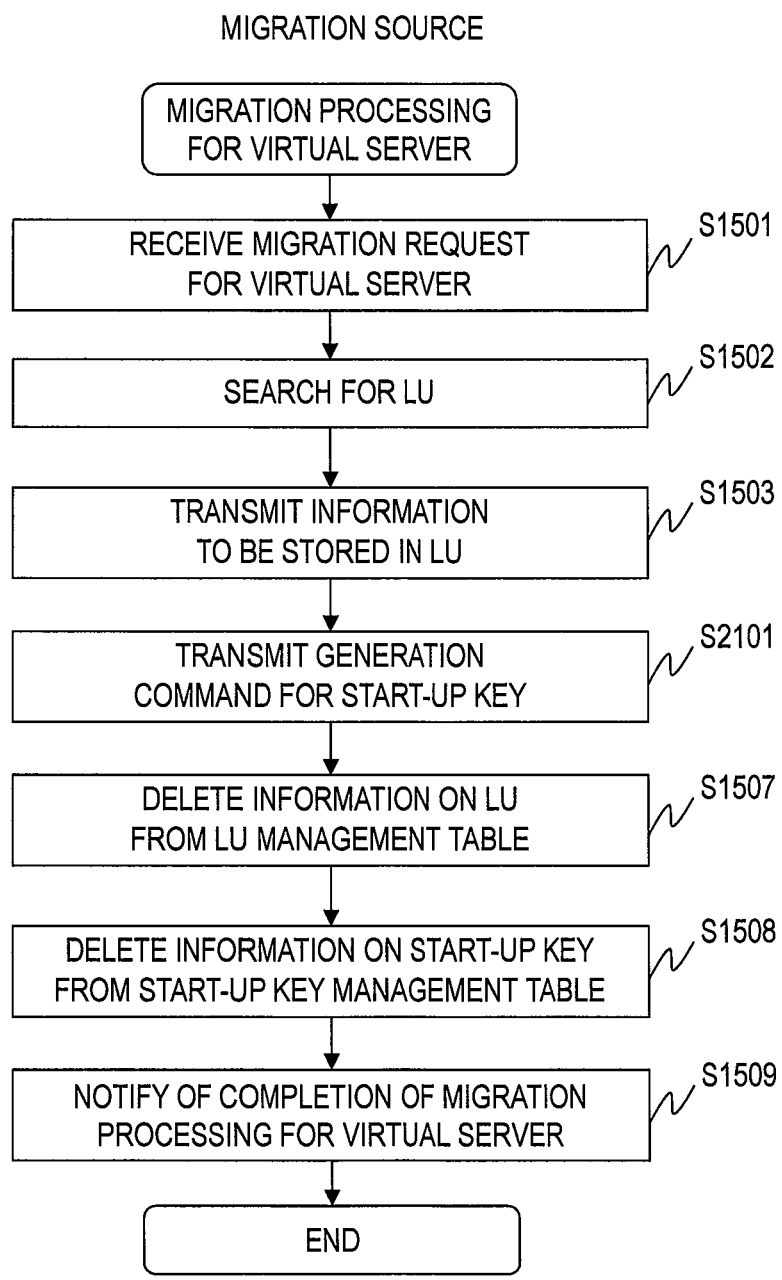
FIG. 21 is a flowchart illustrating details of processing executed by the virtualization management module of the migration source according to the third embodiment of this invention.

FIG. 21 is a flowchart illustrating details of processing executed by the virtualization management module 110-1 of the migration source according to the third embodiment of this invention.

Processing in Steps 1501 to 1503 and 1507 to 1509 is the same as that of the first embodiment, and hence a description thereof is omitted.

After the executable image of the virtual server 117 is transmitted (Step 1503), the start-up key transmission module 221 transmits the generation command for the start-up key to the virtualization management module 110-2 (Step 2101). It should be noted that the generation command may include information for generating the start-up key.

Figure 22:
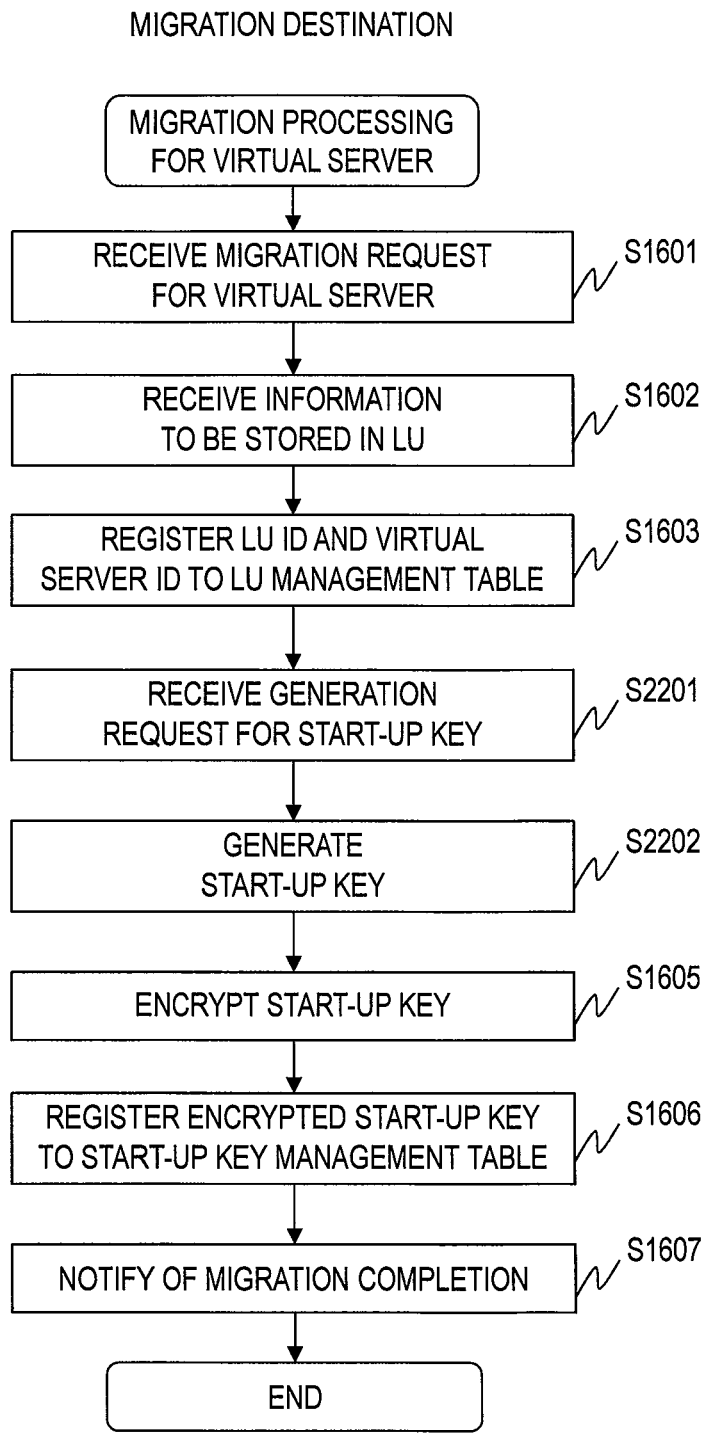
FIG. 22 is a flowchart illustrating details of processing executed by the virtualization management module of the migration destination according to the third embodiment of this invention.

FIG. 22 is a flowchart illustrating details of processing executed by the virtualization management module 110-2 of the migration destination according to the third embodiment of this invention.

Processing in Steps 1601 to 1603 and 1605 to 1607 is the same as that of the first embodiment, and hence a description thereof is omitted.

In a case where the virtual server migration module 113 receives the generation request for the start-up key by executing the start-up key reception module 222 (Step 2201), the virtual server migration module 113 invokes the start-up key processing module 111 to request the generation of the start-up key.

The invoked start-up key processing module 111 generates the start-up key by executing the start-up key generation module 201 (Step 2202). It should be noted that, as a generation method for the start-up key, the same method as in Step 802 is used.

The start-up key processing module 111 notifies the virtual server migration module 113 of, along with the generated start-up key, the completion of the generation of the start-up key. The virtual server migration module 113 that has received the notification resumes the processing.

According to the third embodiment of this invention, the start-up key is not transmitted during the migration processing, and hence a risk of obtaining of the start-up key by means of communication interception or other such method is eliminated. The security can thus further be enhanced.

It should be noted that, according to this invention, the first, second and third embodiments may be combined.

Though the detailed description has been given of this invention referring to the attached drawings, this invention is not limited to this specific configuration, and includes various variations and equivalent configurations within the scope of the accompanying claims.

What is claimed is:

1. A method of managing a virtual computer in a computer system including a plurality of computers,
the plurality of computers including a first computer,
the first computer having a first processor, a first memory coupled to the first processor, a first network interface coupled to the first processor, and a first storage medium coupled to the first processor, the first memory storing a program for realizing a first virtualization management module for generating at least one virtual computer by dividing a computer resource included in the computer and managing the at least one virtual computer, the first memory including a first management storage area that is accessible only by the first virtualization management module, the first storage medium including a logical storage area generated by logically dividing a storage area of the first storage medium, the logical storage area storing a service program for executing a service on the at least one virtual computer, the first management storage area storing first start-up management information representing a correspondence among identification information on the at least one virtual computer, identification information on the logical storage area of the first storage medium storing the service program, and start-up authentication information for starting the at least one virtual computer, the first computer having a first virtual computer for executing a first service program generated thereon, the method comprising:

a first step of generating, by the first virtualization management module, first start-up authentication information, in a case of receiving a generation command for the start-up authentication information for starting the first virtual computer;

a second step of storing, by the first virtualization management module, a correspondence among the identification information on the first virtual computer, the identification information on the logical storage area of the first storage medium storing the first service program, and the generated first start-up authentication information in the first start-up management information;

a third step of referring, by the first virtualization management module, to the first start-up management information based on the identification information on the first virtual computer to determine whether the first start-up authentication information corresponding to the first virtual computer exists, in a case of receiving a start-up request for the first virtual computer including the identification information on the first virtual computer;

a fourth step of reading, by the first virtualization management module, the first service program from the logical storage area of the first storage medium, in a case where the first virtualization management module determines that the first start-up authentication information corresponding to the first virtual computer exists in the first start-up management information; and a fifth step of starting, by the first virtualization management module, the first virtual computer by executing the read first service program.

2. The method of managing a virtual computer according to claim 1, wherein:

the first step further includes encrypting the generated first start-up authentication information; and the second step includes storing a correspondence among the identification information on the first virtual computer, the identification information on the logical storage area storing the first service program, and the encrypted first start-up authentication information in the first start-up management information.

3. The method of managing a virtual computer according to claim 2, wherein:

the third step includes determining whether the encrypted first start-up authentication information corresponding to the first virtual computer exists; and the fourth step includes:

determining whether the encrypted first start-up authentication information is decryptable, in a case where it is determined that the encrypted first start-up authentication information corresponding to the first virtual computer exists; and reading, the first service program from the logical storage area of the first storage medium, in a case where it is determined that the encrypted first start-up authentication information is decryptable.

4. The method of managing a virtual computer according to claim 2, wherein:

the plurality of computers include a second computer;

the second computer has a second processor, a second memory coupled to the second processor, a second network interface coupled to the second processor, and a second storage medium coupled to the second processor;

the second memory stores a program for realizing a second virtualization management module for generating the at least one virtual computer and managing the generated at least one virtual computer;

the second memory includes a second management storage area that is accessible only by the second virtual management module and that stores second start-up management information representing a correspondence among identification information on the at least one virtual computer, identification information on the logical storage area of the second storage medium storing the service program, and start-up authentication information for starting the at least one virtual computer;

the second storage medium includes a logical storage area generated by logically dividing a storage area of the second storage medium; and the method further comprises:

a sixth step of extracting, by the first virtualization management module, the identification information on the first virtual computer included in a migration request, in a case of receiving the first the migration request to migrate the first virtual computer to the second computer;

a seventh step of referring, by the first virtualization management module, to the first start-up management information based on the extracted identification information on the first virtual computer to read the first service program from the logical storage area of the first storage medium;

an eighth step of transmitting, by the first virtualization management module, the identification information on the first virtual computer and the read first service program to the second computer;

a ninth step of obtaining, by the first virtualization management module, the encrypted first start-up authentication information from the first start-up management information based on the extracted identification information on the first virtual computer;

a tenth step of decrypting, by the first virtualization management module, the encrypted first start-up authentication information, and transmitting the decrypted first start-up authentication information to the second computer;

an eleventh step of deleting, by the first virtualization management module, from the first start-up management information, the correspondence among the identification information on the first virtual computer, the identification information on the logical storage area storing the first service program, and the encrypted first start-up authentication information;

a twelfth step of storing, by the second virtualization management module, the first service program in the logical storage area of the second storage medium and encrypting the decrypted first start-up authentication information, in a case of receiving the identification information on the first virtual computer, the first service program, and the decrypted first start-up authentication information; and a thirteenth step of storing, by the second virtualization management module, the correspondence among the identification information on the first virtual computer, the identification information on the logical storage area storing the first service program, and the encrypted first start-up authentication information in the second start-up management information.

5. The method of managing a virtual computer according to claim 2, wherein:

the plurality of computers include a second computer;

the second computer has a second processor, a second memory coupled to the second processor, a second network interface coupled to the second processor, and a second storage medium coupled to the second processor;

the second memory stores a program for realizing a second virtualization management module for generating the at least one virtual computer and managing the generated at least one virtual computer;

the second memory includes a second management storage area that is accessible only by the second virtualization management module and that stores second start-up management information representing a correspondence among identification information on the at least one virtual computer, identification information on the logical storage area of the second storage medium storing the service program, and start-up authentication information for starting the at least one virtual computer; and the method further comprises:

a fourteenth step of extracting, by the first virtualization management module, the identification information on the first virtual computer included in a migration request, in a case of receiving the migration request to migrate the first virtual computer to the second computer;

a fifteenth step of referring, by the first virtualization management module, to the first start-up management information based on the extracted identification information on the first virtual computer to read the first service program from the logical storage area of the first storage medium;

a sixteenth step of transmitting, by the first virtualization management module, the identification information on the first virtual computer and the read first service program to the second computer;

a seventeenth step of deleting, by the first virtualization management module, from the first start-up management information, the correspondence among the identification information on the first virtual computer, the identification information on the logical storage area storing the first service program, and the encrypted first start-up authentication information;

an eighteenth step of storing, by the second virtualization management module, the first service program in the logical storage area of the second storage medium and generating second start-up authentication information for starting the first virtual computer, in a case of receiving the identification information on the first virtual computer and the first service program; and a nineteenth step of storing, by the second virtualization management module, a correspondence among the identification information on the first virtual computer, the identification information on the logical storage area storing the first service program, and the generated second start-up authentication information in the second start-up management information.

6. The method of managing a virtual computer according to claim 1, wherein the first step includes using the identification information on the first virtualization management module to generate the first start-up authentication information.

7. The method of managing a virtual computer according to claim 1, wherein the first step further includes using the generated first authentication information to encrypt the logical storage area of the first storage medium storing the first service program.

8. A computer system, comprising a plurality of computers, wherein:

the plurality of computers include a first computer;

the first computer has a first processor, a first memory coupled to the first processor, a first network interface coupled to the first processor, and a first storage medium coupled to the first processor;

the first memory stores a program for realizing a first virtualization management module for generating at least one virtual computer by dividing a computer resource included in the computer and managing the at least one virtual computer;

the first memory includes a first management storage area that is accessible only by the first virtualization management module;

the first storage medium includes a logical storage area generated by logically dividing a storage area of the first storage medium;

the logical storage area stores a service program for executing a service on the at least one virtual computer;

the first management storage area stores first start-up management information representing a correspondence among identification information on the at least one virtual computer, identification information on the logical storage area storing the service program, and start-up authentication information for starting the at least one virtual computer;

the first computer has a first virtual computer for executing a first service program generated thereon; and the first computer is configured to:

generate first start-up authentication information, in a case of receiving a generation command for the start-up authentication information for starting the first virtual computer;

store a correspondence among the identification information on the first virtual computer, the identification information on the logical storage area of the first storage medium storing the first service program, and the generated first start-up authentication information in the first start-up management information;

refer to the first start-up management information based on the identification information on the first virtual computer to determine whether or not the first start-up authentication information corresponding to the first virtual computer exists, in a case of receiving an start-up request for the first virtual computer including the identification information on the first virtual computer;
read the first service program from the logical storage area of the first storage medium, in a case where the first computer determines that the first start-up authentication information corresponding to the first virtual computer exists in the first start-up management information; and
start the first virtual computer by executing the read first service program.

9. The computer system according to claim 8, wherein the first computer is configured to:
further encrypt the generated first start-up authentication information, in a case where the first computer generates the first start-up authentication information; and
store a correspondence among the identification information on the first virtual computer, the identification information on the logical storage area storing the first service program, and the encrypted first start-up authentication information in the first start-up management information.

10. The computer system according to claim 9, wherein the first computer is further configured to:
determine whether the encrypted first start-up authentication information corresponding to the first virtual computer exists, in a case where the first computer determines whether the first start-up authentication information corresponding to the first virtual computer exists;
determine whether the encrypted first start-up authentication information is decryptable, in a case where the first computer determines that the encrypted first start-up authentication information corresponding to the first virtual computer exists; and
read the first service program from the logical storage area of the first storage medium, in a case where the first computer determines that the encrypted first start-up authentication information is decryptable.

11. The computer system according to claim 9, wherein:
the plurality of computers include a second computer;
the second computer has a second processor, a second memory coupled to the second processor, a second network interface coupled to the second processor, and a second storage medium coupled to the second processor;
the second memory stores a program for realizing a second virtualization management module for generating the at least one virtual computer and managing the generated at least one virtual computer;
the second memory includes a second management storage area that is accessible only by the second virtualization management module and that stores second start-up management information representing a correspondence among identification information on the at least one virtual computer, identification information on the logical storage area storing the service program, and start-up authentication information for starting the at least one virtual computer;
the second storage medium includes a logical storage area generated by logically dividing a storage area of the second storage medium;
the first computer is further configured to:
extract the identification information on the first virtual computer included in a migration request, in a case of receiving the migration request to migrate the first virtual computer to the second computer;
refer to the first start-up management information based on the extracted identification information on the first virtual computer to read the first service program from the logical storage area of the first storage medium;
transmit the identification information on the first virtual computer and the read first service program to the second computer;
obtain the encrypted first start-up authentication information from the first start-up management information based on the extracted identification information on the first virtual computer;
decrypt the encrypted first start-up authentication information, and transmit the decrypted first start-up authentication information to the second computer; and
delete, from the first start-up management information, the correspondence among the identification information on the first virtual computer, the identification information on the logical storage area storing the first service program, and the encrypted first start-up authentication information; and
the second computer is configured to:
store the first service program in the logical storage area of the second storage medium and encrypt the decrypted first start-up authentication information, in a case of receiving the identification information on the first virtual computer, the first service program, and the decrypted first start-up authentication information; and
store a correspondence among the identification information on the first virtual computer, the identification information on the logical storage area storing the first service program, and the encrypted first start-up authentication information in the second start-up management information.

12. The computer system according to claim 9, wherein:
the plurality of computers include a second computer;
the second computer has a second processor, a second memory coupled to the second processor, a second network interface coupled to the second processor, and a second storage medium coupled to the second processor;
the second memory stores a program for realizing a second virtualization management module for generating the at least one virtual computer and managing the generated at least one virtual computer;
the second memory includes a second management storage area that is accessible only by the second virtualization management module and that stores second start-up management information representing a correspondence among identification information on the at least one virtual computer, identification information on the logical storage area storing the service program, and start-up authentication information for starting the at least one virtual computer;
the first computer is configured to:
extract the identification information on the first virtual computer included in a migration request, in a case of receiving the migration request to migrate the first virtual computer to the second computer;
refer to the first start-up management information based on the extracted identification information on the first virtual computer to read the first service program from the logical storage area of the first storage medium;
transmit the identification information on the first virtual computer and the read first service program to the second computer; and
delete, from the first start-up management information, the correspondence among the identification information on the first virtual computer, the identification information on the logical storage area storing the first service program, and the encrypted first start-up authentication information; and the second computer is configured to:
store the first service program in the logical storage area of the second storage medium and generate second start-up authentication information for starting the first virtual computer, in a case of receiving the identification information on the first virtual computer and the first service program; and
store a correspondence among the identification information on the first virtual computer, the identification information on the logical storage area storing the first service program, and the generated second start-up authentication information in the second start-up management information.

13. The computer system according to claim 8, wherein the first computer further uses the identification information on the first virtualization management module to generate the first start-up authentication information, in a case where the first computer generates the first start-up authentication information.

14. The computer system according to claim 8, wherein the first computer further uses the generated first start-up authentication information to encrypt the logical storage area of the first storage medium storing the first service program, in a case where the first computer generates the first start-up authentication information.

15. A computer, comprising:
a processor;
a memory coupled to the processor;
a network interface coupled to the processor; and
a storage medium coupled to the processor, wherein:
the memory stores a program for realizing a virtualization management module for generating at least one virtual computer by dividing a computer resource included in the computer and for managing the at least one virtual computer;
the memory includes a management storage area that is accessible only by the virtualization management module;
the storage medium includes a logical storage area generated by logically dividing a storage area of the storage medium;
the logical storage area stores a service program for executing a service on the at least one virtual computer;
the management storage area stores start-up management information representing a correspondence among identification information on the at least one virtual computer, identification information on the logical storage area storing the service program, and start-up authentication information for starting the at least one virtual computer; and
the computer is configured to:
generate the start-up authentication information, in a case of receiving a generation command for the start-up authentication information for starting the at least one virtual computer;
store a correspondence among identification information on the at least one virtual computer, identification information on the logical storage area of the storage medium storing the service program, and the generated start-up authentication information in the first start-up management information;
refer to the start-up management information based on the identification information on the at least one virtual computer to determine whether the start-up authentication information corresponding to the at least one virtual computer exists, in a case of receiving an start-up request for the at least one virtual computer including the identification information on the virtual computer;
read the service program from the logical storage area of the storage medium, in a case where the computer determines that the start-up authentication information corresponding to the at least one virtual computer exists in the start-up management information; and
start the at least one virtual computer by executing the read service program.

16. The computer according to claim 15, wherein the computer is further configured to:
further encrypt the generated start-up authentication information, in a case where the computer generates the start-up authentication information; and
store a correspondence among the identification information on the at least one virtual computer, the identification information on the logical storage area storing the service program, and the encrypted start-up authentication information in the start-up management information.

17. The computer according to claim 16, wherein the computer is further configured to:
determine whether the encrypted start-up authentication information corresponding to the at least one virtual computer exists, in a case where the computer determines whether the start-up authentication information corresponding to the at least one virtual computer exists;
determine whether the encrypted start-up authentication information is decryptable, in a case where the computer determines that the encrypted start-up authentication information corresponding to the at least one virtual computer exists; and
read the service program from the logical storage area of the storage medium, in a case where the computer determines that the encrypted start-up authentication information is decryptable.

18. The computer according to claim 16, wherein the computer is further configured to:
extract the identification information on the at least one virtual computer included in a migration request, in a case of receiving the migration request to migrate the at least one virtual computer to another computer;
refer to the start-up management information based on the extracted identification information on the at least one virtual computer to read the service program from the logical storage area of the storage medium;
transmit the identification information on the at least one virtual computer and the read service program to the computer of a migration destination;
refer to the start-up management information based on the extracted identification information on the at least one virtual computer to obtain the encrypted start-up authentication information;
decrypt the encrypted start-up authentication information, and transmit the decrypted start-up authentication information to the computer of the migration destination;
delete, from the start-up management information, the correspondence among the identification information on the at least one virtual computer, the identification information on the logical storage area storing the service program, and the encrypted start-up authentication information;
store the service program in the logical storage area of the storage medium, and encrypt the decrypted start-up authentication information, in a case of receiving from the another computer the identification information on the at least one virtual computer, the service program, and the decrypted start-up authentication information; and store a correspondence among the identification information on the at least one virtual computer, the identification information on the logical storage area storing the service program, and the encrypted start-up authentication information in the start-up management information.

19. The computer according to claim 16, wherein the computer is further configured to:

extract the identification information on the at least one virtual computer included in a migration request, in a case of receiving the migration request to migrate the at least one virtual computer to another computer;

refer to the start-up management information based on the extracted identification information on the at least one virtual computer to read the service program from the logical storage area of the storage medium;

transmit the identification information on the at least one virtual computer and the read service program to the computer of a migration destination;

delete, from the start-up management information, the correspondence among the identification information on the at least one virtual computer, the identification information on the logical storage area storing the service program, and the encrypted start-up authentication information;

store the service program in the logical storage area of the storage medium and generate the start-up authentication information for starting the at least one virtual computer, in a case of receiving from the another computer the identification information on the at least one virtual computer and the service program; and store a correspondence among the identification information on the at least one virtual computer, the identification information on the logical storage area storing the service program, and the generated start-up authentication information in the start-up management information.

* * * * *